United States Patent [19]
Bate

[11] 3,922,958
[45] Dec. 2, 1975

[54] PACKAGING

[76] Inventor: Frederick Douglas Clavell Bate, 155 Barkerhouse Road, Nelson, Lancashire, England

[22] Filed: Mar. 1, 1974

[21] Appl. No.: 447,268

Related U.S. Application Data

[63] Continuation-in-part of Ser. No. 341,526, March 15, 1973, Pat. No. 3,881,296.

[30] Foreign Application Priority Data
Mar. 15, 1973 United Kingdom............... 12542/73
June 29, 1972 United Kingdom............... 30399/72

[52] U.S. Cl. ............. 93/33 H; 93/DIG. 1; 156/515; 156/583; 93/94 R
[51] Int. Cl.²......................... B31B 1/66; B31B 1/16
[58] Field of Search............ 93/33 H, DIG. 1, 35 R, 93/19, 20, 8 R, 77 R, 94 R; 156/515, 583

[56] References Cited
UNITED STATES PATENTS

| | | | |
|---|---|---|---|
| 2,272,251 | 2/1942 | Robinson............................ | 93/19 X |
| 2,492,530 | 12/1949 | Kriegsheim...................... | 93/DIG. 1 |
| 2,698,046 | 12/1954 | Finke................................ | 93/DIG. 1 |
| 2,884,988 | 5/1959 | D'Angelo......................... | 93/DIG. 1 |
| 3,058,403 | 10/1962 | Kugler.............................. | 93/DIG. 1 |
| 3,735,673 | 5/1973 | Sheehan et al. ................. | 93/DIG. 1 |

FOREIGN PATENTS OR APPLICATIONS

| | | | |
|---|---|---|---|
| 1,125,141 | 3/1962 | Germany.......................... | 93/DIG. 1 |

*Primary Examiner*—Roy Lake
*Assistant Examiner*—James F. Coan
*Attorney, Agent, or Firm*—Norris & Bateman

[57] ABSTRACT

Method and apparatus for forming a package wherein two layers of wrapping film are continuously fed through a sealing station at a preselected velocity, the stroke length of a reciprocable sealing device at that station having a path parallel to that of the film feed so that it travels in a forward direction at the same linear speed as the film, the sealing device is brought into operative relationship with the layers of film during at least part of its forward travel in each cycle to produce a transverse sealing together of the two film layers, and the film layers are severed along a transverse line bounded on both sides by one of the transverse seals so as to form separate film tubes sealed along transverse edges but open at the longitudinal edges. The sealing mechanism comprises apparatus for traversing the film in a forward direction along a predetermined path and an articulated holding device for the film adapted to reciprocate along a path parallel to the path of the film and carrying the sealing device which is brought into operative relationship with the film layers during at least part of the forward motion of the articulated holding device.

22 Claims, 31 Drawing Figures

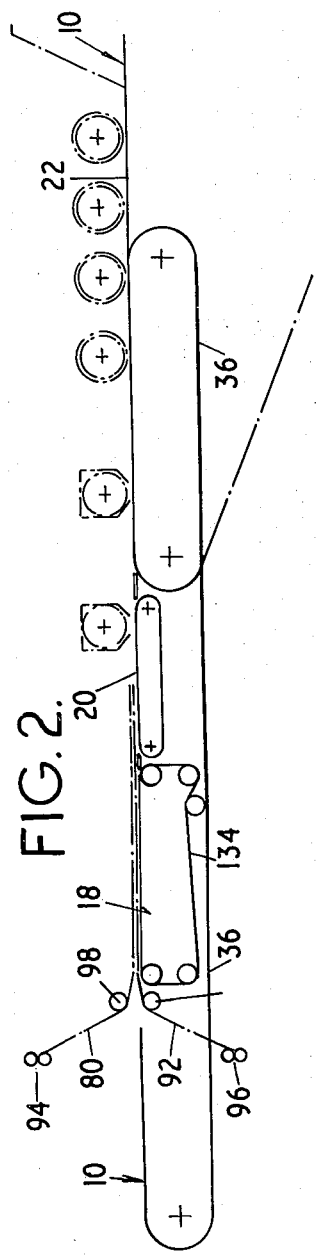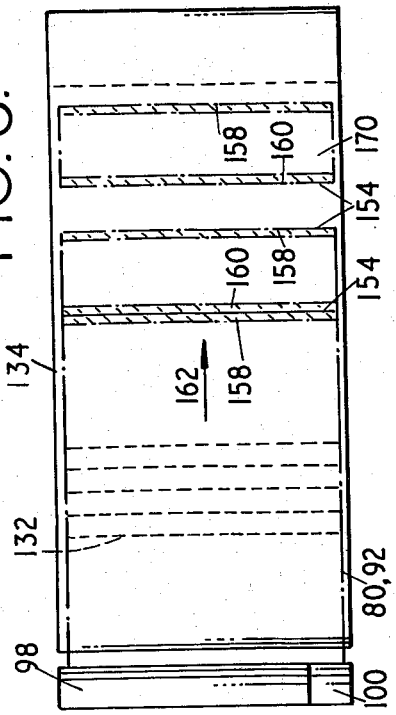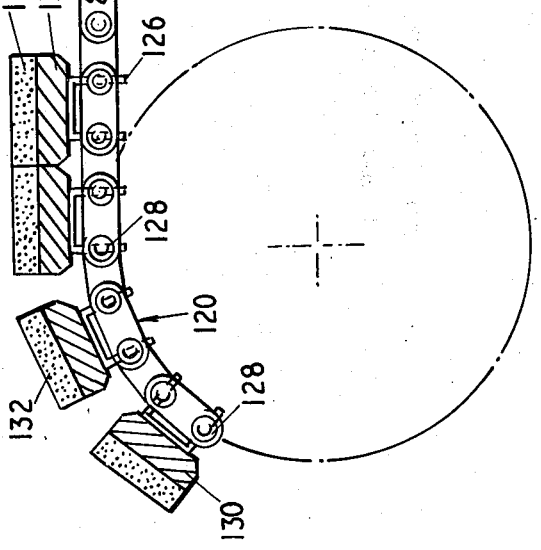

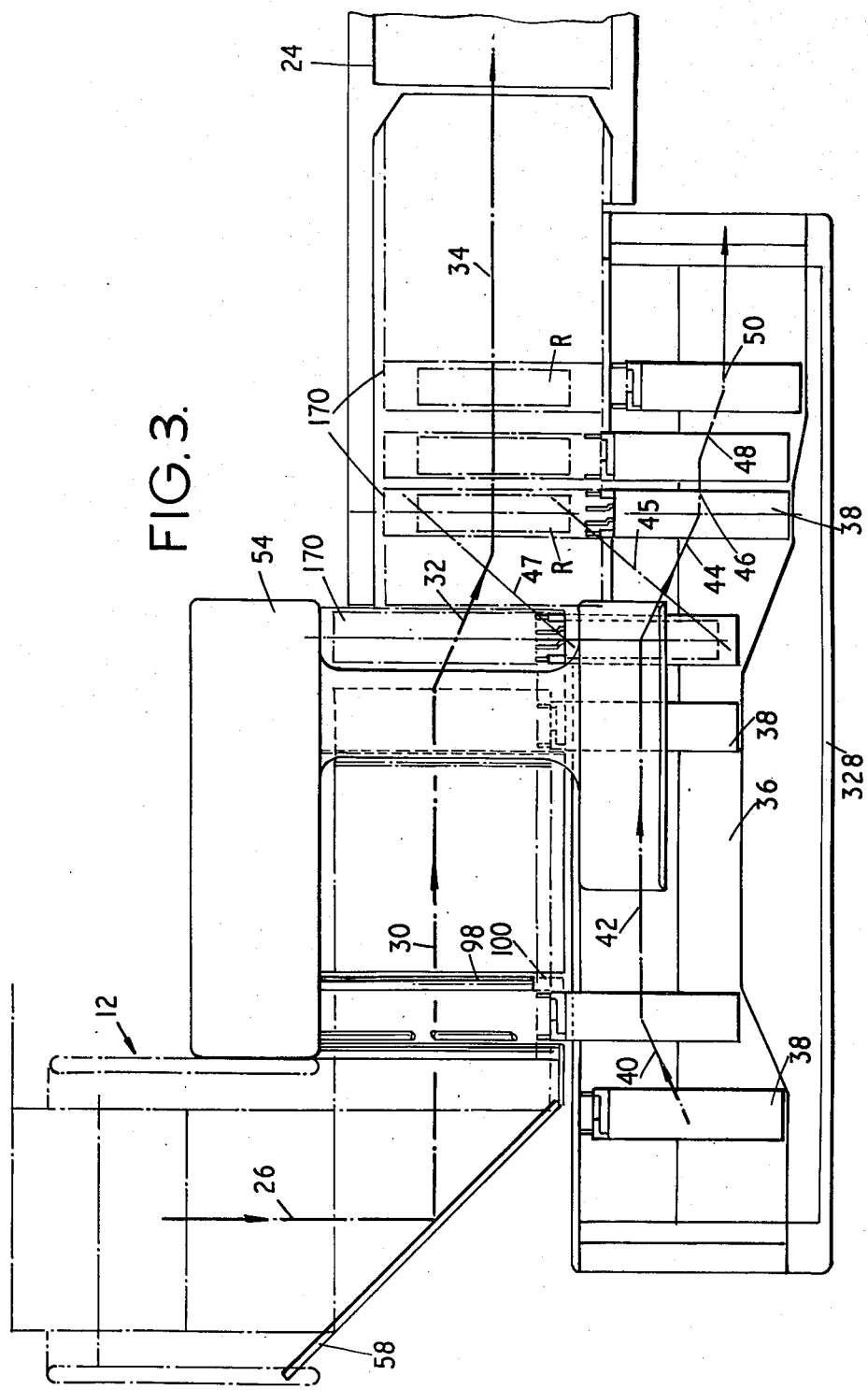

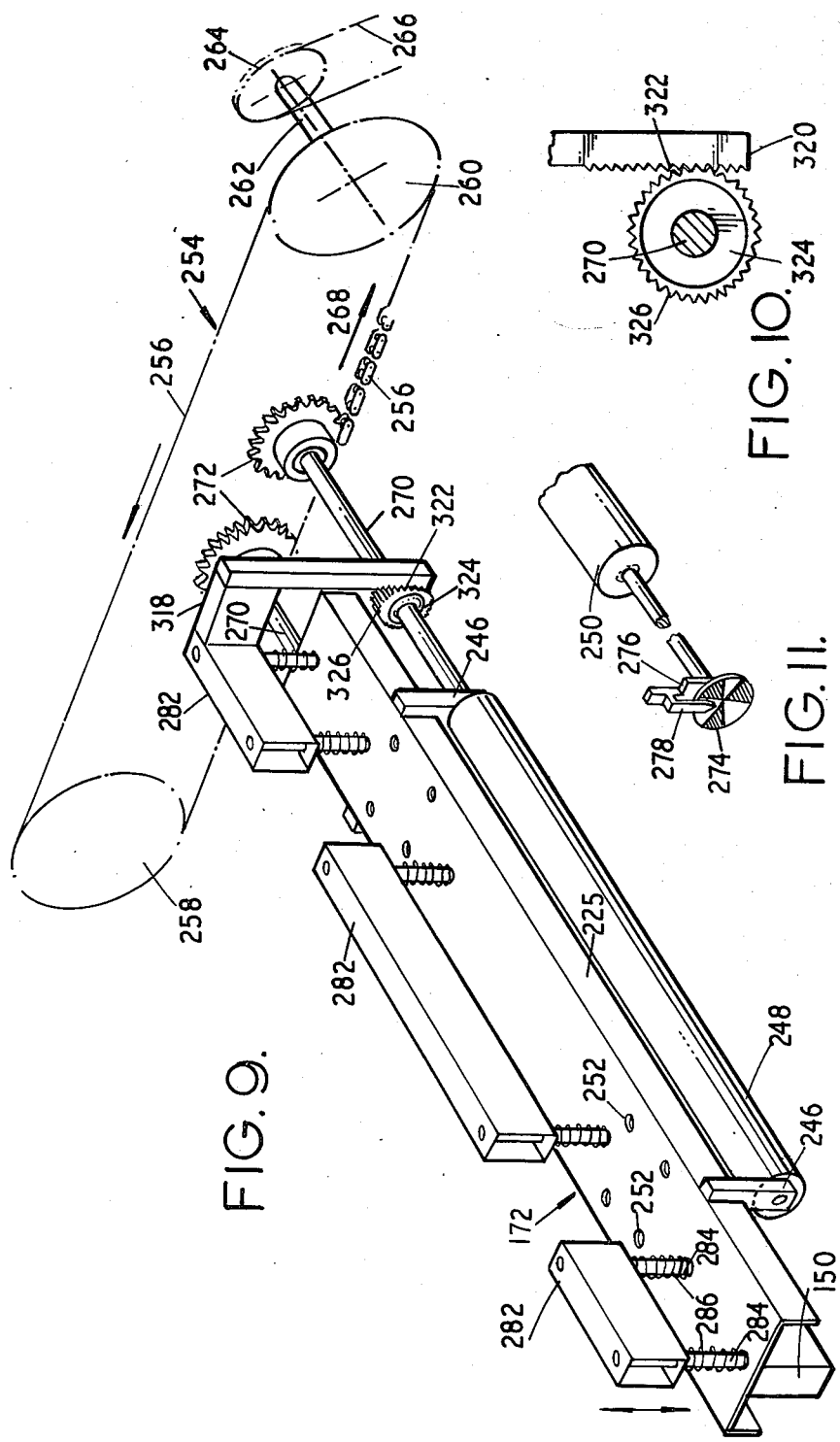

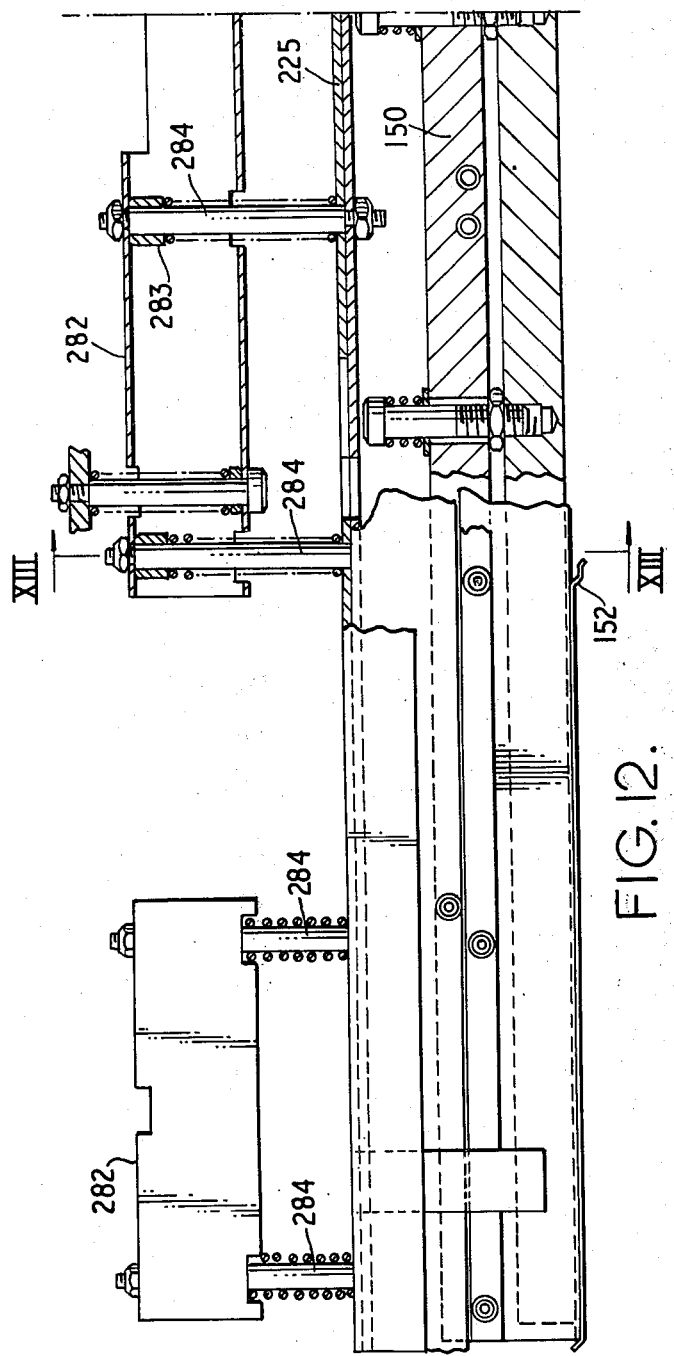

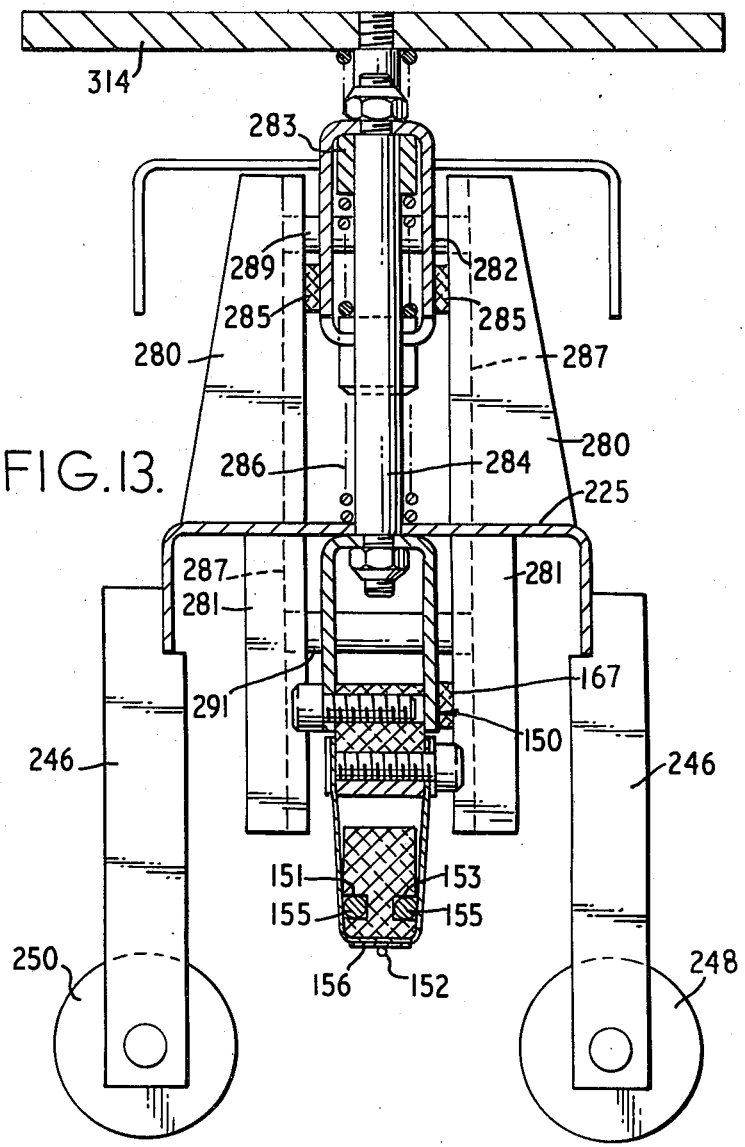
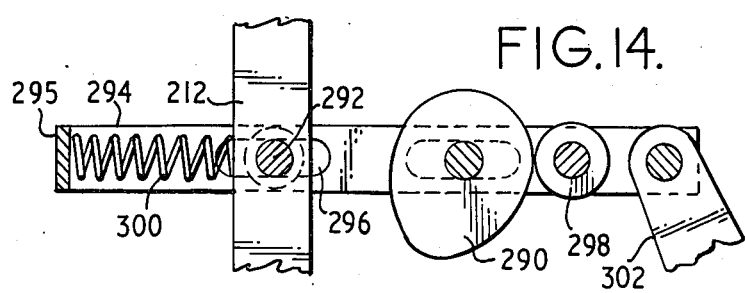

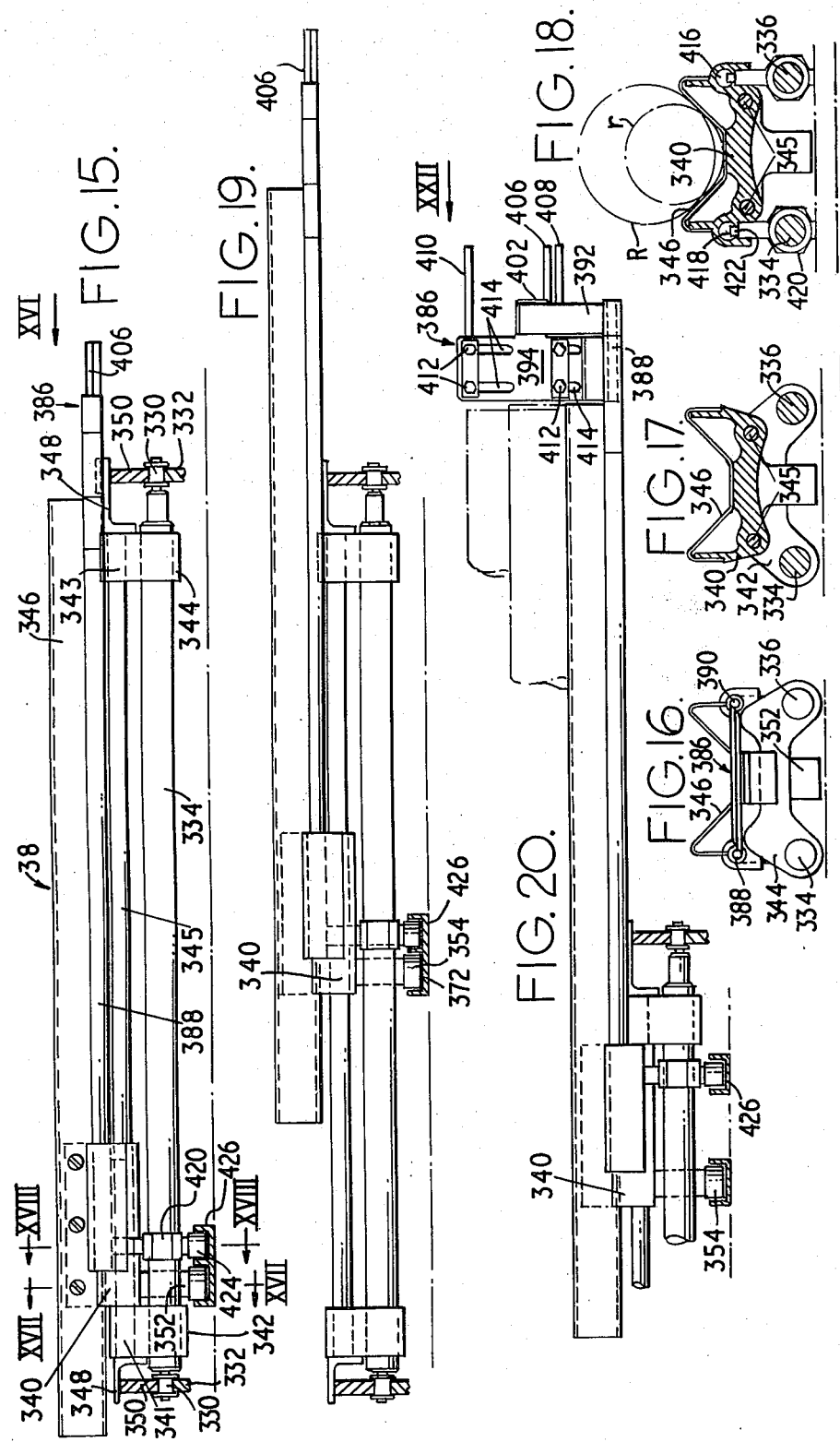

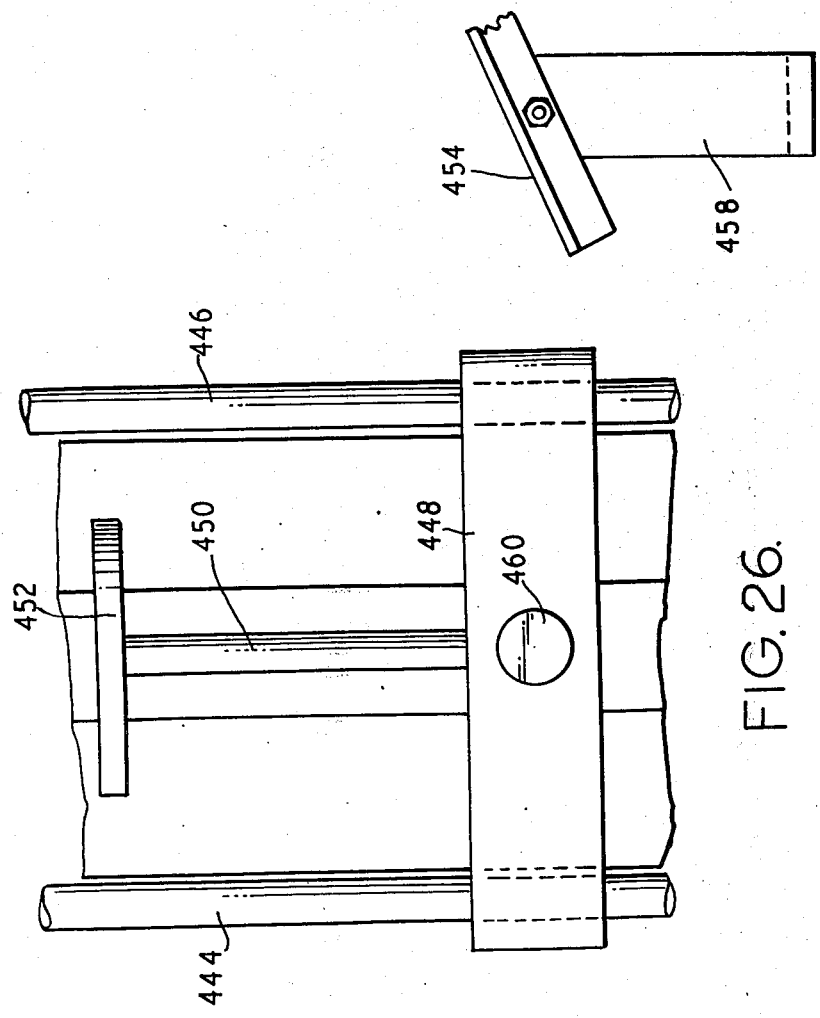

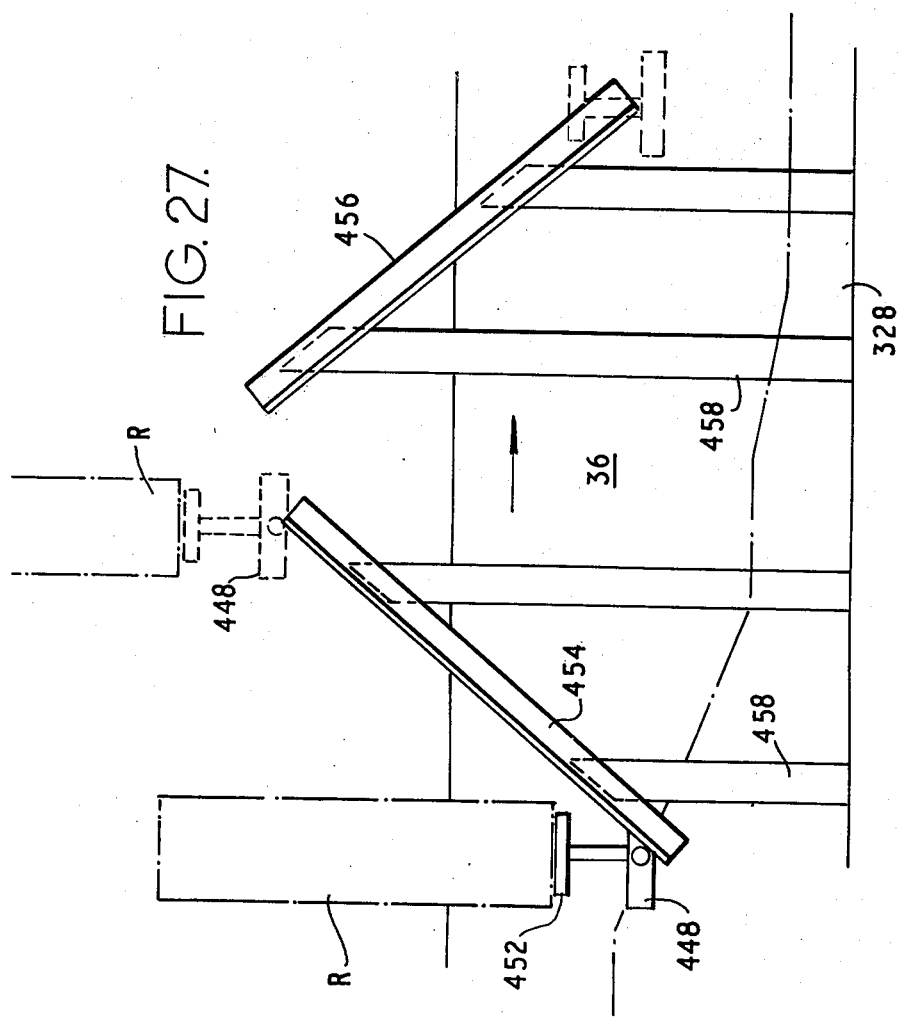

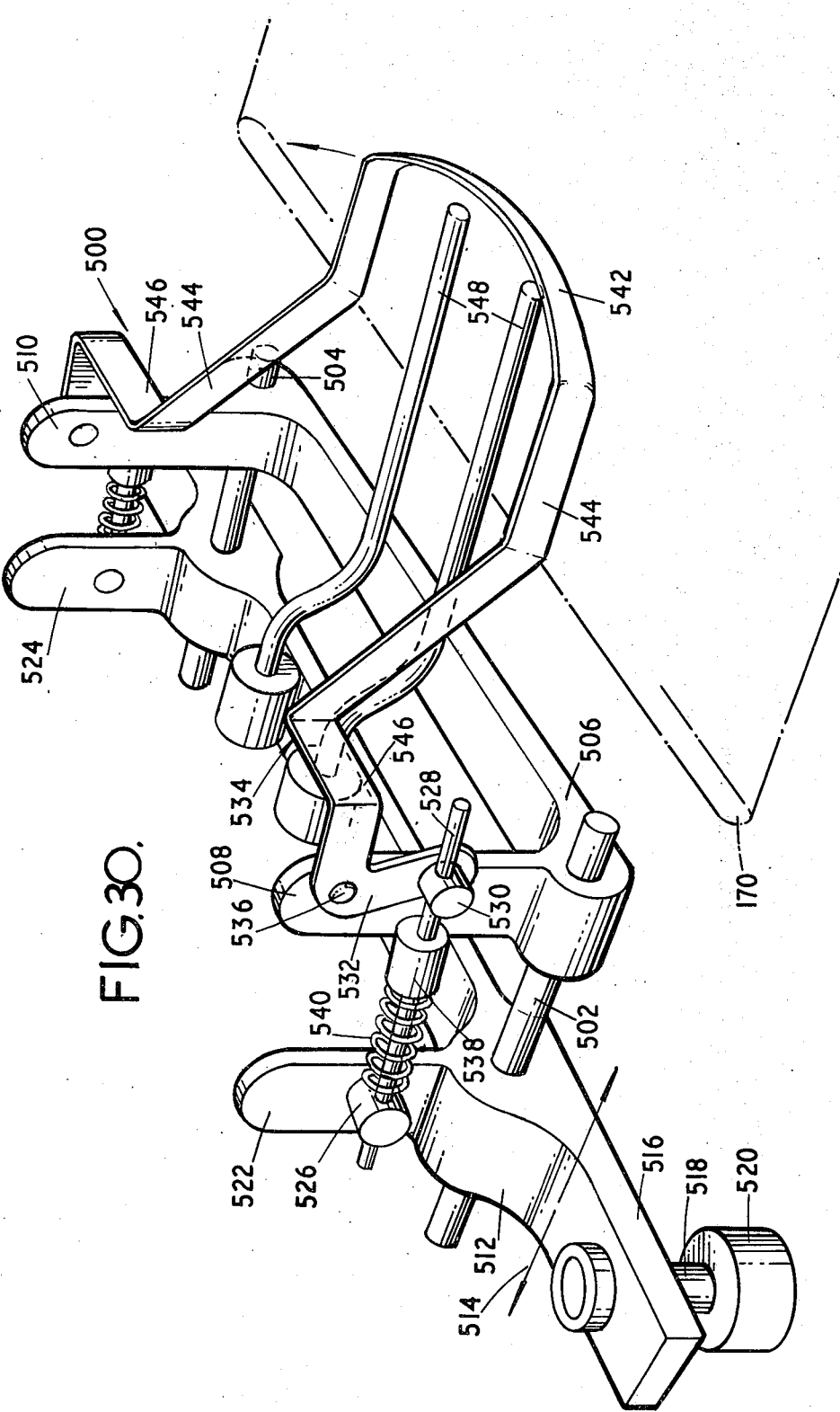

PACKAGING

This is a continuation-in-part of Ser. No. 341,526 filed Mar. 15, 1973, now U.S. Pat. No. 3,881,296.

In the packaging industry it is sometimes required to form tubes or envelopes by causing two overlying layers of sheet material to adhere to each other at spaced-apart regions, leaving an open-ended tube (one or both ends of which may be subsequently sealed) between the two spaced-apart adhering regions.

For example, bags of paper or plastics film can be produced by feeding long lengths of two layers of the paper or film through a sealing station and causing the layers to adhere to each other in longitudinally spaced transverse bands. This produces a continuous series of tubes to receive the articles to be wrapped. It is also possible to sever the paper or film along each adhering band, so that the tubes become separated from each other.

In the shrink-wrapping of goods on the other hand, it is not usual to prepare bags or tubes and then to insert the article to be wrapped into the bag or tube. Instead, two sources of film are used, and the "free" ends of the two films are sealed together so that there is formed a barrier of film extending vertically between the two supply sources (usually reels). An article to be wrapped — and the expression "article" will be used herein to include a collection of articles which are to be wrapped together as a collation — is then traversed in a direction at right angles to and passing through the film barrier. As a result, film is drawn off the supply sources and the film becomes wrapped first over the leading side of the article, and then over the top and bottom of the article. The two films are then brought together on the trailing side of the article and severed on a transverse line and simultaneously sealed together on both sides of the line of cut. The article is then wrapped in a tube of film which is open at both ends, and a fresh barrier of film is created ready to receive the next article. The film is considerably wider than the article, and hence the tube overhangs the article at both ends. These overhanging parts of the tube can be gathered and sealed together so that the article is totally enclosed ready for the heat-shrinking of the film wrapping, or the overlapping parts of the film can simply be allowed to contract on to the ends of the article if total enclosure by the wrapping film is not essential.

Thus it will be appreciated that there have been two distinct types of packaging, one which involves the formation of packets into which the article to be wrapped is fed, and the other involving the wrapping of the film around the article to produce the package.

In the specification of U.S. Pat. Application Ser. No. 341,526 there is described a method of forming a package for an article comprising feeding two layers of wrapping film in proximity to each other along aligned paths in the same direction, causing an adherent relationship between the two layers of film at transversely extending positions spaced apart relatively to the direction of feed, and then opening out the two layers between two successive adhering regions so that the length of film between the adhering regions forms a tube. In other words, the tubes are formed in the flattened condition in somewhat similar fashion to the way in which bags are prepared, but then the tubes are opened to receive the articles to be wrapped.

The present invention is concerned with a method and apparatus for forming packaging tubes, and the invention is capable of application either to the manufacture of bags or the provision of a wrap for a shrink-wrapping process.

According to one aspect of the invention a method of forming a package the size of which can be selected within a given range comprises the steps of: continuously feeding two layers of wrapping film through a sealing station at a velocity selected within a given range; matching the stroke length of a reciprocable sealing device having a variable stroke length and a path parallel to that of the film feed, so that it travels in a forward direction at the same linear speed as the film, and bringing the sealing device into operative relationship with the layers of film during at least part of its foward travel in each cycle to produce a transverse sealing together of the two film layers.

According to a preferred feature of the invention the sealing device is maintained in a constant orientation relatively to the path of the film throughout the reciprocating cycle of the sealing device. Preferably the film layers are severed along a transverse line bounded on both sides by one of the transverse seals, to form separate film tubes along transverse edges but open at the longitudinal edges.

According to another aspect of the invention a sealing mechanism for sealing together two layers of wrapping film at longitudinally spaced apart positions comprises means for traversing the film in a forward direction along a predetermined path, an articulated holding means for the film being adapted to reciprocate along a path parallel to the path of the film, this articulated holding means carrying a sealing device, there being also means for bringing the sealing device into operative relationship with the film layers during at least part of the forward motion of the articulated holding means. Preferably the length of the stroke of the holding means is adjustable. In one form of the invention the means for causing reciprocation of the articulated part comprises an oscillating motion transmitter of variable stroke length.

Preferably the holding means co-operates with a conveyor element adapted to travel continuously in the forward direction of the film travel, the articulated holding means being adapted to press the film layers on to the conveyor element.

According to another preferred feature of the invention, driving means for the articulated part of the holding means includes a cam adapted to be rotated at an angular velocity directly rotated to the linear speed of the conveyor element. Preferably there is also a cam driven mechanism adapted to be operated in synchronism with the conveyor element, and further adapted to cause movement of the sealing device towards the conveyor element, during that part of the cycle of the holding means, when the sealing device is required to carry out its sealing function.

It is also preferred that the holding means is adapted to remain in a constant orientation relatively to the path of movement of the layers of film.

According to another preferred feature of the invention the articulated part comprises a carriage having a pair of rollers for engagement with the film. Preferably the rollers are each geared to an endless chain driven at a linear speed directly related to that of the conveyor element, the gear ratio providing that on forward movement of the carriage there is no rotation of each roller about its own axis.

According to a still further preferred feature of the invention, at least one roller of the carriage is adapted to be given a sudden rotation at the end of the forward movement of the carriage, for the purpose of pulling a tube of film away from the following bulk of film.

Other preferred features of the invention will appear from the following description of a specific embodiment of the invention which is described by way of example only. The machine here described is also described in the specification of U.S. Pat. application No: 341,526.

In the accompanying drawings:

SPECIFIC EMBODIMENT.

A machine for producing packs, which is constructed and adapted to operate in accordance with the invention and its method of operation will now be described by way of example only with reference to the accompanying drawings, in which:

FIG. 2 is a diagrammatic elevation of a basic conveyor arrangement,

Figure 4:
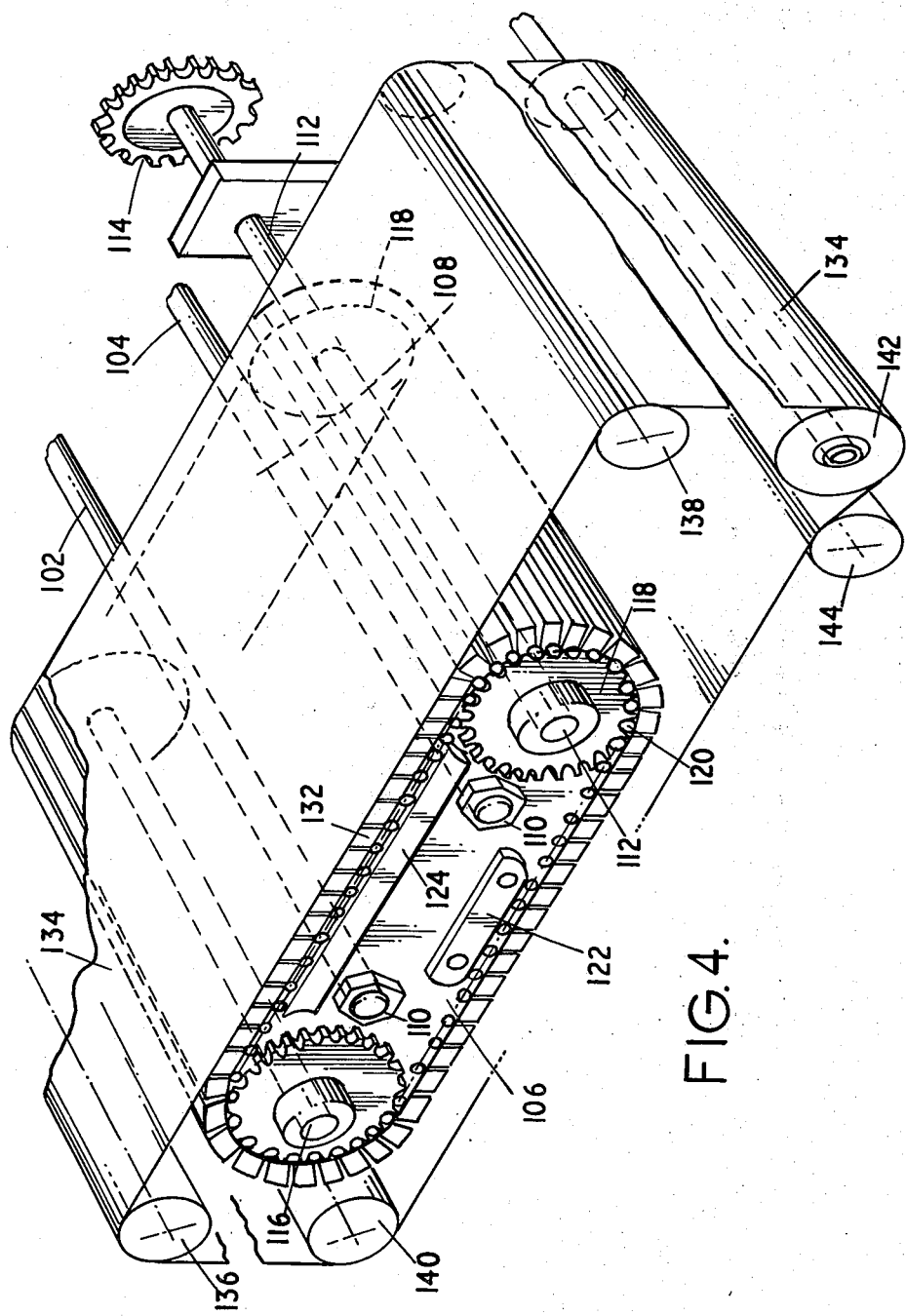
Figure 7:
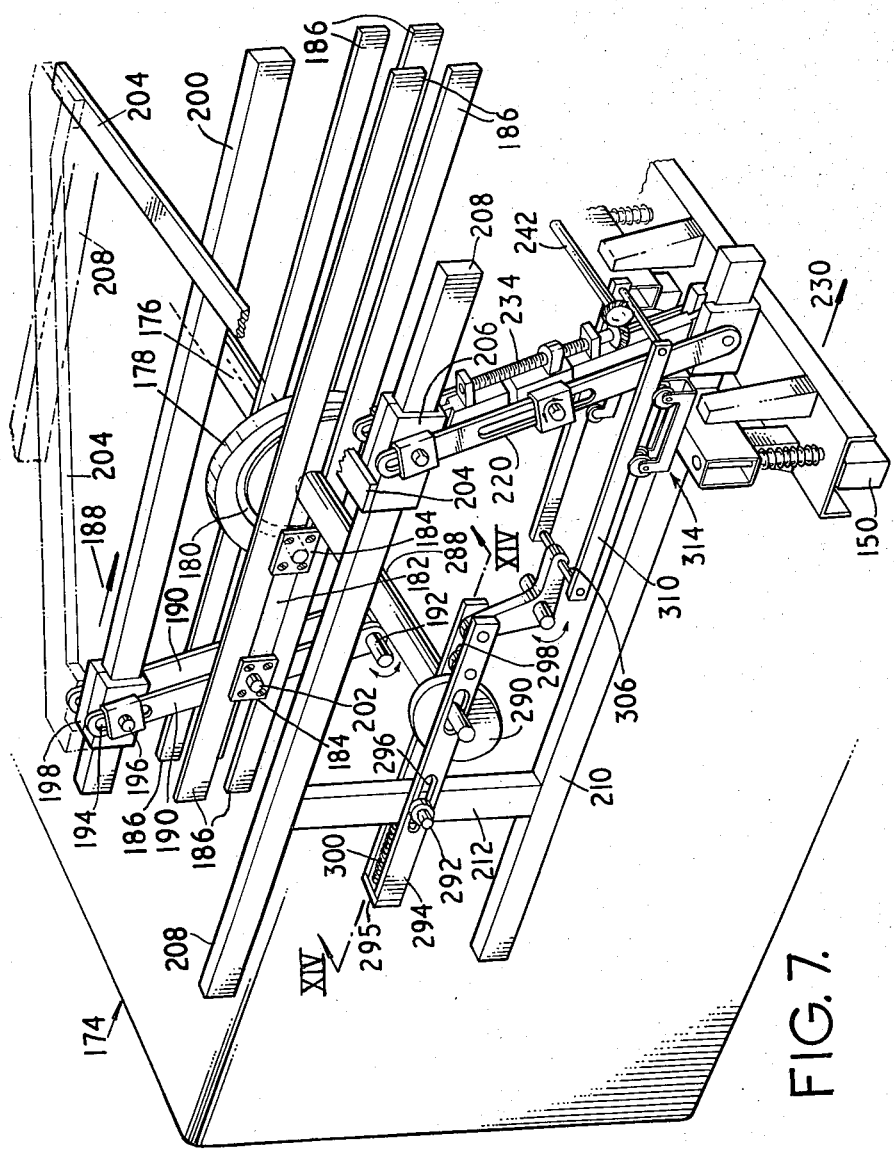
Figure 8:
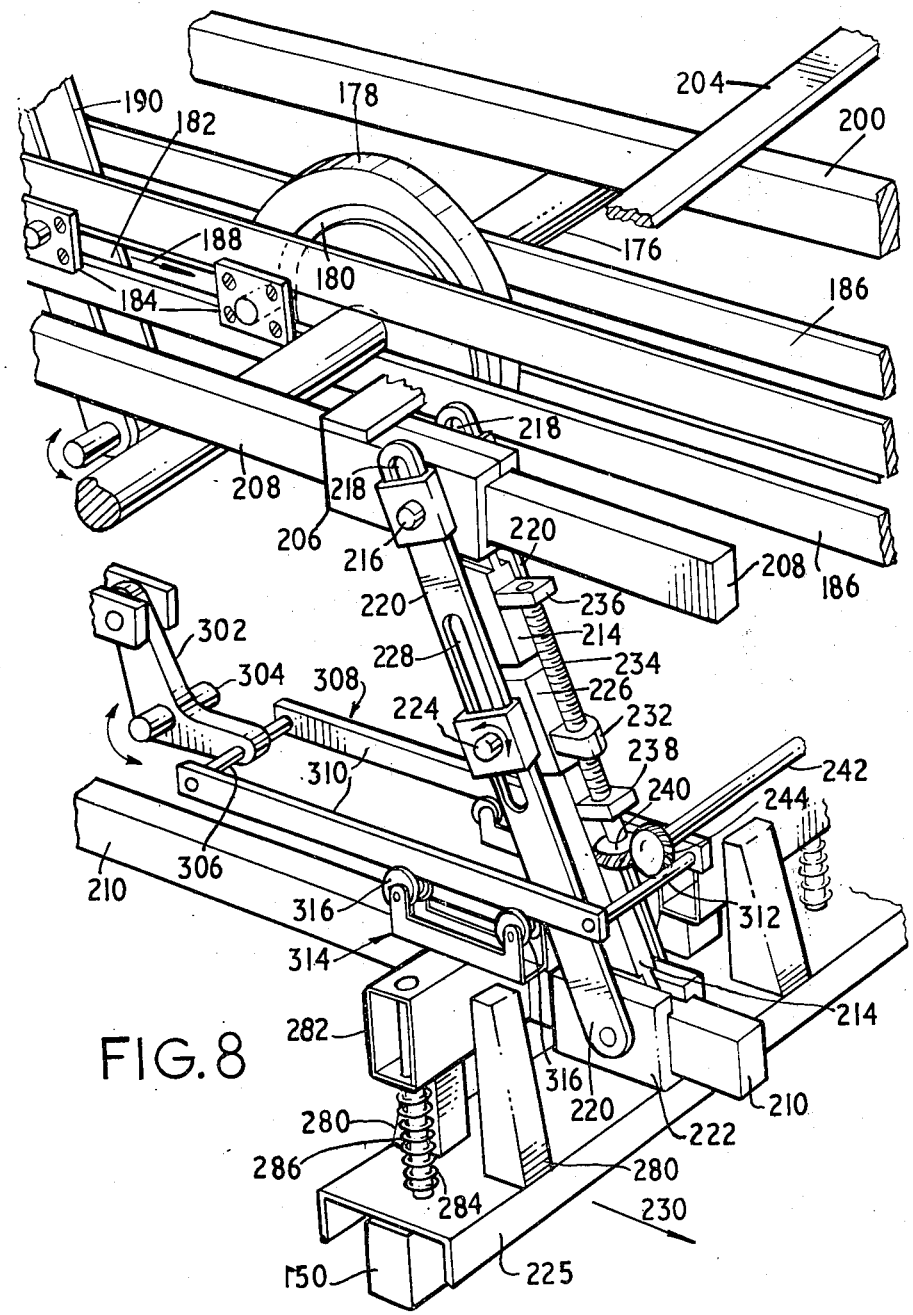
Figure 21:
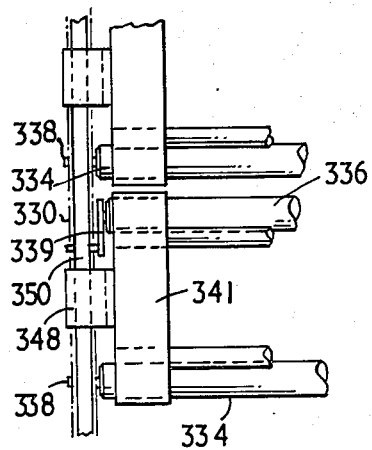
Figure 22:
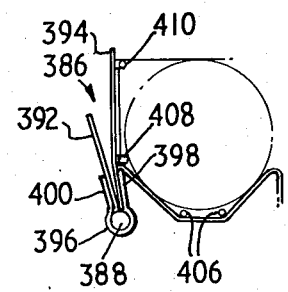
Figure 23:
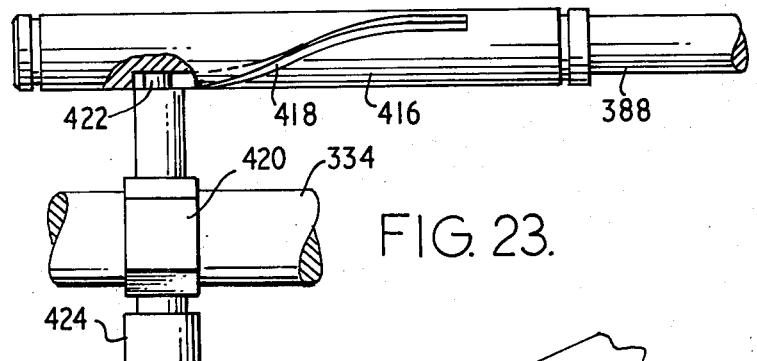
Figure 29:
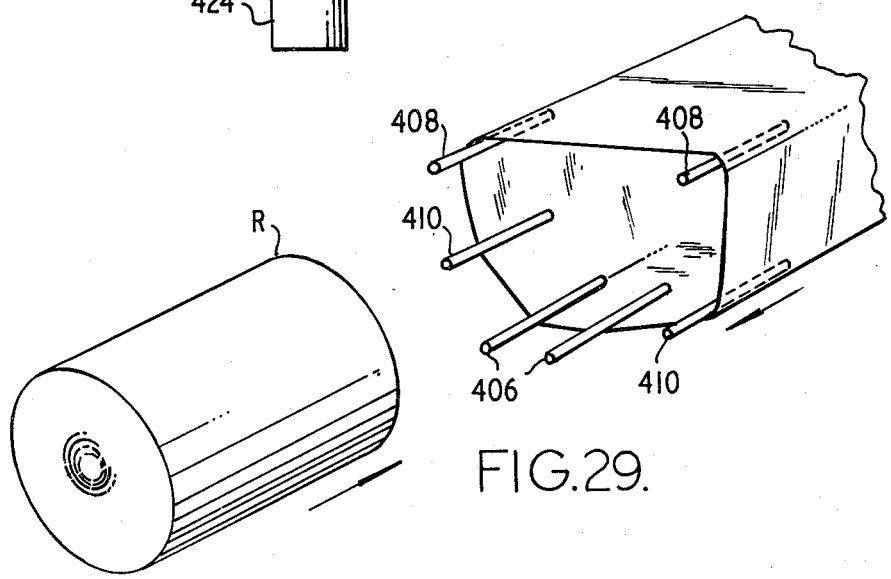
Figure 24:
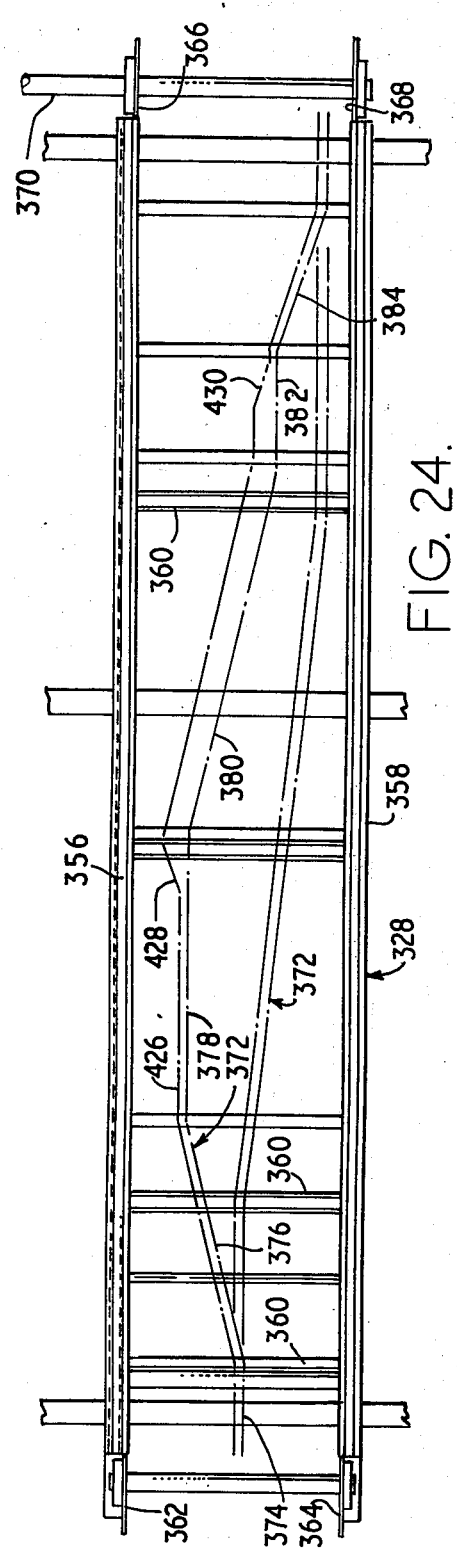
Figure 28:
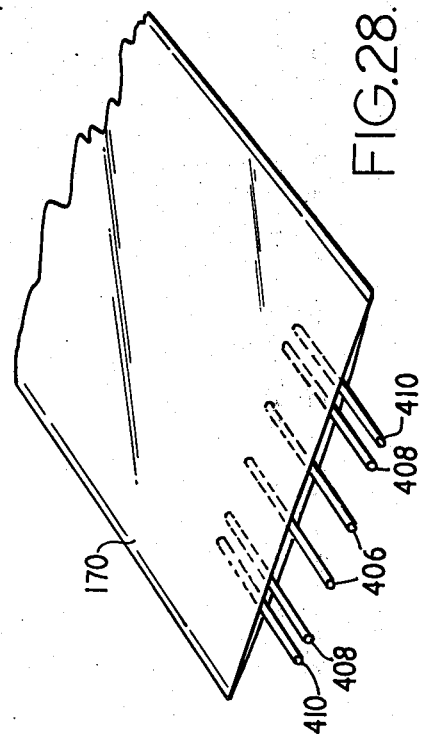
Figure 25:
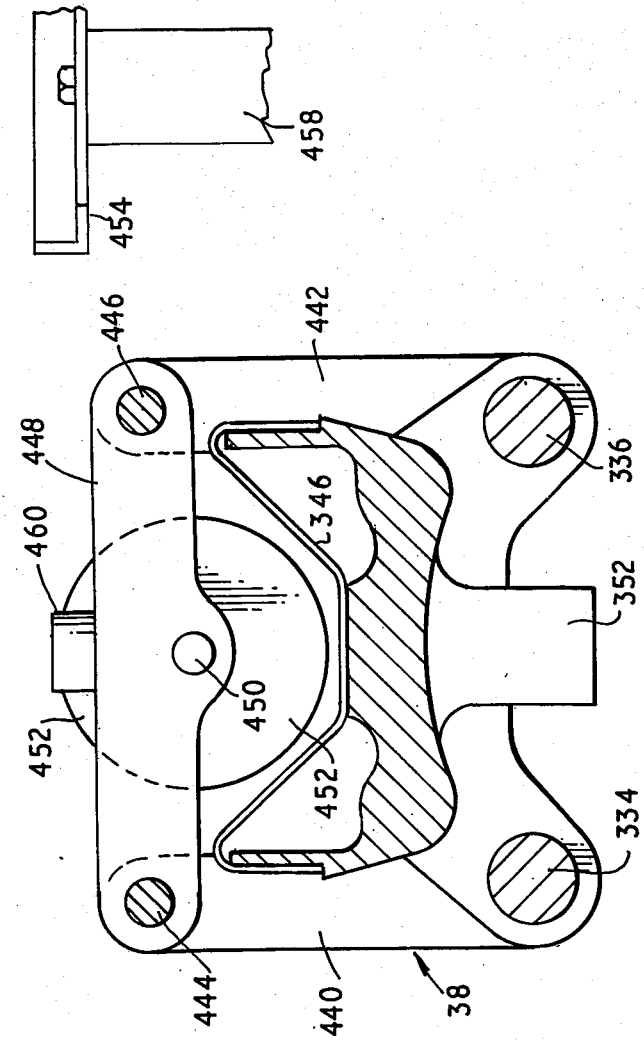
Figure 31:
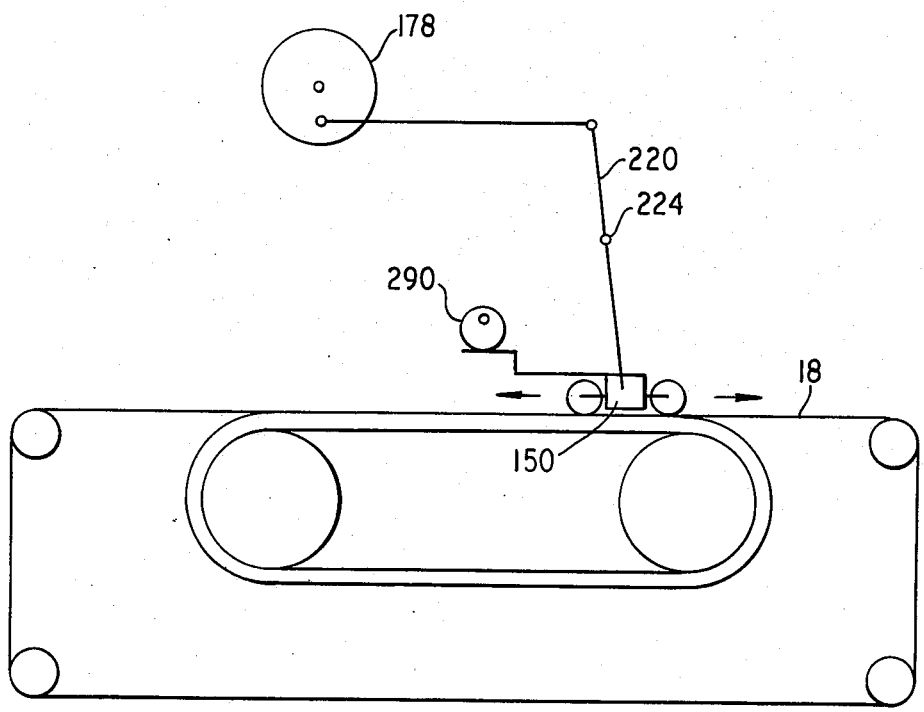

FIG. 3 is a diagrammatic plan view of the machine, showing packages being formed on the machine, FIG. 4 is a perspective view of a film feed conveyor, FIG. 5 is a detailed end view partly in section, and to a larger scale showing part of the film feed conveyor, FIG. 6 is a plan view of the film feed conveyor showing the formation of bags thereon, FIG. 7 is a perspective view of a sealer head operating mechanism, FIG. 8 is a perspective view to a larger scale of part of the sealer head operating mechanism, FIG. 9 is a perspective view of a carriage, part of which is also shown in FIG. 7, FIG. 10 is a side view to a larger scale of a flicking mechanism shown in FIG. 9, FIG. 11 is a detail perspective view of part of an indicator, FIG. 12 is a front view partly in section of a sealer head, FIG. 13 is a section on the line XIII—XIII in FIG. 12 showing the sealer head in detail, FIG. 14 is a section on the line XIV—XIV of FIG. 7 showing another part of the sealer head operating mechanism, FIG. 15 is an end view of a product carrier shown in a retracted position, FIG. 16 is a view looking in the direction of arrow XVI in FIG. 15, FIG. 17 is a section on the line XVLL—XVII in FIG. 15, FIG. 18 is a section on the line XVIII—XVIII in FIG. 15, FIG. 19 is a view similar to FIG. 15, but showing the carrier partially projected, FIG. 20 is a view similar to FIG. 15, but showing the carrier fully projected and a finger mechanism activated, FIG. 21 is a detail plan view of one end of the product carrier shown in FIG. 15, FIG. 22 is a view looking in the direction of arrow XXII in FIG. 20, showing the pack opening mechanism in an operative position, FIG. 23 is a detail view of a finger operating mechanism, FIG. 24 is a diagrammatic plan view of a product feed framework, FIG. 25 is a view similar to FIG. 17, but showing a pusher mechanism, FIG. 26 is a plan view of the mechanism shown in FIG. 25, FIG. 27 is a plan view of a pusher cam arrangement, FIG. 28 is a perspective view showing the position after formation of a film tube with a finger opening mechanism in the closed position, FIG. 29 is a perspective view showing the position of a tube after operation of the finger opening mechanism, FIG. 30 is a perspective view showing an alternative form of tube opening mechanism, and FIG. 31 is a diagrammatic representation of the sealing mechanism.

GENERAL LAYOUT OF MACHINE.

The machine is constructed as decribed in detail in the Specification of Pat. Application Ser. No: 341,526, and only so much detail of the machine as is necessary for an understanding of the present invention will be described here.

The purpose of the machine is to wrap articles of regular prismatic shape, and in this particular instance, the machine is intended to wrap rolls of wallpaper, which present a problem in that they are long relatively narrow articles. The rolls must be completely enveloped in heat shrinkage plastics film such as polyvinylchloride, ready for passing through a shrinking zone in which heat is applied to tighten the film on the paper roll.

The machine is a processing machine having a series of stages at which a sequence of pack-forming steps is carried out. In this particular machine the stages are arranged along a horizontal path through the machine (the path being indicated by the line 10, 10 in FIG. 2) but it is to be understood that this is a matter of convenience, and the machine could be arranged with a non-horizontal path.

At the input end of the machine (shown at the left hand end in FIGS. 1 to 3) there is a film feed arrangement generally designated 12. The film feed will be hereinafter described in detail, but, it will be mentioned that there are vertically spaced mountings for reels 14 and 16 of the heat shrinkable plastics film, one above and one below the horizontal path 10.

The machine is adapted to bring the two films together and to produce a series of separate packages therefrom, as will be described, but it is necessary to mention at this stage, that the film travels successively over three conveyors; namely — a film feed conveyor 18, a wrapper conveyor 20 and a shrink tunnel conveyor 22. The latter passes through a shrink tunnel 24 at the output end of the machine, this tunnel being a known apparatus in which heat is applied to the envelope of film to shrink that film into tight engagement with the article being wrapped.

The general path of the film through the machine as seen in plan is indicated by the chain dotted line 26, 30, 32 and 34 in FIG. 3. From the film reels 14 and 16, the film passes in the path 26 at right angles to the general longitudinal path through the machine; then is turned through 90°; then it travels along the path 30 which is parallel with the general longitudinal path, and it leaves the machine along the path 34 which is parallel with the general path. It is to be observed however, that the paths 30 and 34 are offset from each other, and there is a short inclined path 32 between them, which is an important feature of the invention.

In front of the three conveyors 18, 20 and 22, there is a product conveyor 36, and it will be seen that parts of this conveyor are alongside parts of all three film conveyors. The product conveyor 36 includes a series of carriers 38, which will be described in some detail hereinafter. It is to be noted however, that the carriers 38 do not travel in a rectilinear path as seen in plan (FIG. 3) but in a path designated 40, 42, 44, 46, 48 and 50. During the part of the carrier cycle indicated by the line 40, a carrier travels with a compound movement in the general longitudinal direction and also rearwardly towards the path of the film. Along the path 42, the carrier 38 travels parallel with the film, and then it travels in a compound stepped movement, indicated by the lines 44, 46 and 48 forwardly, away from the path of the film, and then along the path 50 parallel with the general longitudinal direction. From the path 50, the carriers 38 return along the bottom run of the conveyor 36. The wrapping function is performed by interaction of the articles carried by the product conveyor 36 and the film as it travels along the conveyors 18, 20 and 22.

To the rear of the film feed conveyor 18, there is a housing 54 for the main driving mechanism (not shown) of the machine, this driving mechanism including an electric motor and suitable gearing. A control panel 55 is also provided, this being connected to the housing 54 by a trunk 57.

FILM FEED

Figure 1:
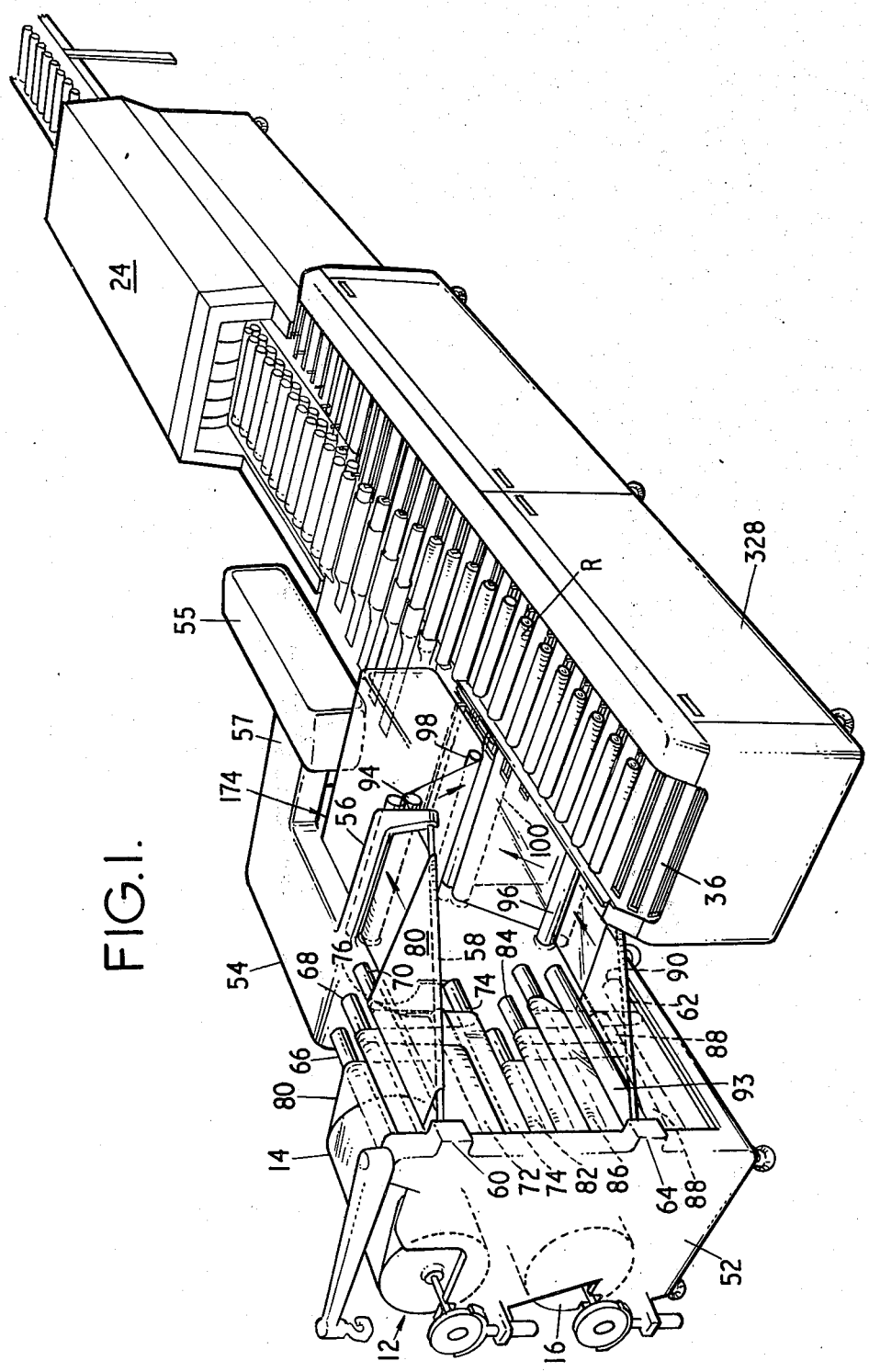
FIG. 1 is a perspective view showing the general layout of the machine.

The film feed 12 is a known type and therefore need not be described in great detail. It is designed to store the two reels of film 14 and 16 alongside the machine (see particularly FIG. 1) so as to keep the overall length of the machine as short as possible. The axes of the reels are therefore parallel with the general direction of travel through the machine. The reels are supported on a stationary frame 52 which may form part of the general fixed structure of the machine, (as illustrated in FIG. 1) or it may be a free-standing unit which is simply placed in close juxtaposition with the housing 54 for the main driving mechanism.

An arm 56 extends forwardly from the housing 54, and at its extremity, it provides a support for one end of a cylindrical rod 58, the other end of which is supported in a lug 60 on the frame 52. The rod 58 is inclined at 45° to the axes of the film reels and to the general path of the film through the machine — as seen in plan view. This rod provides a means for changing the direction of travel of the film through an angle of 90°. The rod 58 is in a position to receive the film from the upper reel 14, and there is a similar rod 62 for the film from the lower reel 16, the rod 62 being supported at one end in a lug 64 and at its other end by an arm (not visible in FIG. 1) which is similar to the arm 56.

Two sets of film tensioning rollers are provided in the film feed assembly 12, one set for each film reel. The upper set comprises three parallel rollers 66, 68 and 70 each extending across the path of the film from the reel 14 to the rod 58, these rollers being journalled so that they are able to rotate about their respective longitudinal axes. Thee top set also includes two rollers 72 and 74 mounted parallel with the rollers 66, 68 and 70 and interdigitated therewith. Each roller 72 and 74 is free to rotate about its own longitudinal axis, and in addition, its axle is free to rise and fall in corresponding vertical slots 76 (two of which can be seen in FIG. 1) formed in the frame 52 and in the housing 54.

The film 80 from the top reel 14 passes in a sinuous path over the roller 66, under roller 72 and over roller 68, under roller 74 and over roller 70 to the rod 58. In turning under the rod 58, the film 80 is then passed in a direction indicated by the line 30 in FIG. 3 longitudinally of the machine.

The weight of the rollers 72 and 74 is carried by the film 80, and consequently these rollers tension the film. Also the sinuous extension of the film provides a film reservoir which has already been pulled off the reel 14. If the machine requires film more rapidly than it can conveniently be withdrawn from the reel, then the extra film is drawn from the reservoir, the rollers 72 and 74 rising to shorten the path through the reservoir. Conversely, if the film requirement of the machine is less than the rate of feed from the reel, then the rollers 72 and 74 are lowered and the length of the film reservoir is increased.

The lower set of tensioning rollers comprises three stationary rollers 82, 84 and 86 and two vertically movable rollers 88 and 90, in an arrangement which duplicates that of the upper tensioning rollers. The film 92 from the lower reel 16 passes through the reservoir provided by the rollers, 82, 88, 84, 90 and 86 and then under an extra guide roller 93 before turning under the turning rod 62 in similar fashion to the upper film 80.

The film feed is completed by upper and lower pairs of nip rollers 94 and 96 which are vertically spaced from each other, the rollers of each pair being spring loaded towards each other, and a pair of guide rollers 98 and 100 which are spaced apart a short distance. After leaving the turning rod 58, the film 80 passes through the nip rollers 94 and then under the guide roller 98. The film 92 on the other hand, after leaving its turning rod 62 passes through the nip rollers 96 and over the guide roller 100.

At the guide rollers 98 and 100, the two films 80 and 92 form a mouth, but beyond these rollers the film layers are brought together in a face-to-face relationship by a mechanism to be described, so that they are ready to be formed into an envelope. The film feed provides a means of supplying the film from the two reels 14 and 16 to the rollers 98 and 100. It is, of course, necessary to ensure that the two films are correctly aligned with each other transversely of the machine, and generally the films will be of equal width (as illustrated) so that their longitudinal edges have to be brought into overlying relationship. For this purpose an axial adjustment of the reels 14 and 16 is provided, so that one reel can be moved in an axial direction relatively to the other reel. This is a known method of aligning two film feeds.

An important feature of the machine is that the top roller 98 does not extend as far forwardly as the bottom roller 100.

It is to be understood that the use of a film feed which has its reels parallel to the general path of the film through the machine is not essential. It would be possible to provide a feed mechanism having a pair of reels with their axis transversely disposed in the machine, so that the film passes in a straight path (as seen in plan) to the guide rollers 98 and 100.

FILM SEALING AND SEVERING.

From the guide rollers 98 and 100, the two films 80 and 92 travel together on the film feed conveyor 18, and during this period of travelling on the conveyor 18, the films are formed into a series of flat envelopes with open ends, but sealed along their side edges. To this end, it is necessary to apply a sealing and severing device across the films at longitudinally spaced positions. The sealing and severing device cuts through both films, and also forms a seal, transversely of the conveyor 18 on each side of the cut, thereby sealing the trailing edge of one envelope and the leading edge of the following envelope. Each envelope is thus formed between two successive applications of the sealing and severing device and whereas there is a continuous feed of film through the rollers 98 and 100, it is a succession of separate envelopes which leave the film feed conveyor 18 and passes on to the wrapper conveyor 20.

The conveyor 18 is of special construction, the purpose of which is to provide a resilient base against which a sealing and severing device can act. This special conveyor is illustrated in FIGS. 4 and 5.

A pair of cantilever arms 102 and 104 extends laterally from the main drive housing 54, under the horizontal path 10, and in the region of the film feed conveyor 18. These arms 102 and 104 support the conveyor 18, and are constituted by tubes of substantial dimensions which are secured or welded to the machine framework at their rear ends (not shown). A pair of cheek plates 106 and 108 are provided, and these are mounted on the arms 102 and 104 and secured in position by nuts 110 engaging on screw-threaded extensions of the arms. There are also transversely extending distance pieces (not shown) between the cheek plates 106 and 108.

A driving shaft 112 traverses the cheek plates and is journalled therein near to one end of the plates. This driving shaft projects on the rear of the plate 108 into the housing 54 and there is a driven chain sprocket wheel 114 keyed on to this shaft extension. The driving shaft 112 is adapted to be driven through a chain drive (not shown) to the wheel 114, through gearing from the machine driving motor, so that the shaft 112 rotates continuously at a speed related to that of the machine so long as the machine is in operation. There is a parallel idler shaft 116 journalled in the cheek plates 106 and 108 near to the other end of those plates, but this idler shaft has no extension into the housing 54.

Two chain sprocket wheels 118 are keyed to each of the shafts 112 and 116, on the outsides of the cheek plates 106 and 108, and a roller chain 120 passes around the pair of wheels 118 on each side of the apparatus. A tensioning pad 122 is secured to each cheek plate in such a manner that it can be adjusted vertically. This pad 122 is engaged with the chain 120, and if the chain becomes slack due to wear, the pad is adjusted to deflect the lower run of the chain downwardly, thus applying tension to the chain to take up any slack.

A guide pad 124 is also secured to each cheek plate, and this pad has a horizontal top surface on which the rollers of the chain 120 engage as they travel along the top run of the chain path. The pad 124 is not adjustable and it is important that the top surface of the pad should be in a predetermined position, as this determines the effective path of the conveyor 18.

As is more clearly shown in FIG. 5, a channel 126 is fixed to two adjacent rollers 128 of each chain 120, these channels extending across the full width of the apparatus between the two chains. A metal bar 130 is welded on to each channel 126, and overhangs that channel at each side, so that the bars 130 which are travelling in the straight upper run of the chains abut each other to form an effective platform. Each bar 130 is fitted with a strip of heat resistant silicone rubber 132, and these strips are of the same width as their respective bars, so that on the top run, they form a resilient platform. Part of this platform is clearly shown at the right hand side of FIG. 5.

An endless belt 134 of polytetrafluoroethylene (P.T.F.E.) is provided on the outside of the conveyor formed by the chains 120 and their channels, plates and silicone rubber strips. The belt 134 is guided around rollers 136, 138, 140 and 142, and there is a deflecting roller 144 engaging with the outside of the belt to tension it. The arrangement of the guide rollers is such that the top horizontal run of the belt 134 is in engagement with the platform provided by the strips 132, and this is the effective part of the belt. The roller 142 is a driving roller for the belt 134, and is driven by gearing (not shown) from inside the housing 54, the rollers 136, 138 and 140 are idler rollers. The drive to the belt 134 is so arranged that the linear speed of the belt is equal to that of the strips 132 and hence there is substantially no relative movement between the belt 134 and the platform provided by the strip 132 when the belt and chains 120 are in operation.

The belt 134 and its associated platform of strips 132 provides the film feed conveyor 18 previously referred to, and it is whilst the two layers of film 80 and 92 are travelling on the top run of this conveyor that they are formed into separate envelopes. The manner in which this is achieved is shown diagrammatically in FIG. 6. A sealing head 150 (see FIG. 7) travels over the belt 134, as will be further described, this head is periodically brought down on to the films 80 and 92. The sealing head includes an electric resistance wire 152 (see also FIGS. 12 and 13) which is exposed on the lower surface of the head, and each time the head is applied to the films, the wire 152 is heated by passing a current through it. As a result, the wire cuts through the two films along a transverse line shown at 154 in FIG. 6.

Referring to FIG. 13, it will be seen that the sealer head 150 is a block of metal formed with grooves 151 and 153 along its sides to receive electric resistance heaters 155 which are sealed in protective sheaths. These heaters are constantly on during operation of the machine to maintain the block 150 at a temperature suitable for sealing the layers of film together. A thermostatic device is provided to control the temperature of the block 150. When the flat underside 156 of the sealing head 150 passes on to the top film 80 this seals the two films 80 and 92 together in transverse marginal zones 158 and 160, the zone 158 being on the rear of the line 154 and the zone 160 being on the front of the line 154, having regard to the direction of travel of the film (see arrow 162 in FIG. 6). It is to be understood that, in practice, the seals 158 and 160 are very narrow, and their width has been exaggerated in FIG. 6 for clarity.

The sealing and severing operation separates the continuous film seen arriving from the left in FIG. 6 through the guide rollers 98 and 100, into separate two layer transverse strips such as that shown at 170, moving off to the right. At the same time, the leading and trailing edges of the strips are sealed to produce an open ended tube of film — though at the position shown at the right hand end of FIG. 6, the tube is still in a flattened condition.

It may be observed, that the film tube 170 is shown displaced forwardly — in the direction of travel — from the line along which it was severed from the continuous sheets of film. This is because the sealing mechanism includes means for rapid forward feed (a flicking motion) of the newly separated tube as soon as the film is severed, the flicking motion ensuring that the film tubes are in fact separated. The separatation of the film tubes is essential, because the wrapper conveyor 20 travels at a greater surface speed than the film feed conveyor 18, and the separated tubes have to travel at the same speed as the conveyors 20 and 36.

To assist in feeding the film along the conveyor 18, a feed carriage 172 is provided (see FIGS. 9 and 13) the carriage having rollers 248 and 250 which rest on the film and press the film on to the upper surface of the conveyor belt 134. The carriage 172 has a reciprocating motion, and during its forward travel the rollers 248 and 250 do not rotate, but simply press the film layers together and on to the belt 134, the rollers travelling forward with their carriage 172, at the same linear speed as the top run of the belt 134. Consequently the rollers simply act as nips holding the film securely on the belt 134.

The sealer head 150 is also mounted on the carriage 172, and it is as the carriage begins its forward stroke, that the sealer head is depressed to effect the sealing and severing operation, and at the end of the forward stroke the sealer is withdrawn upwardly and the carriage 172 returns to its starting position. The travel of the carriage in its reciprocating motion is such that its wheels travel most of the length of the platform provided by the silicone rubber strips 132, but the wheels never move off the ends of the support area afforded by that platform.

The sealing of the two layers of film is taking place throughout the forward stroke of the sealing head. This permits accurate control of the sealing operation, which is governed by the temperature of the sealer head 150 and the duration of the application of the head to the film. Thus, by regulating the speed of travel of the film and the head 150, the sealing operation can be controlled.

The mechanism for effecting the reciprocation of the carriage 172 and the vertical displacement of the sealer head 150 is shown in FIGS. 7 to 14 and will now be described in detail.

All the sealer head mechanism shown in FIG. 7 is mounted on the machine above the film feed conveyor 18, and within a housing 174 (see FIG. 1). A driving shaft 176 projects into the housing 174 from the main drive housing 54, and is arranged to be rotated at a speed related to that of the various conveyors, by gearing from the main driving motor. A main driving cam 178 keyed to this shaft 176 has grooves 180 in its faces in each of which a cam follower (not shown) is guided. The cam followers are carried on a slider 182 which has slide blocks 184 running on horizontal guides provided by four fixed guide rails 186. The cam-and-follower device therefore provides a means of converting rotary motion of the shaft 176 into rectilinear reciprocation of the slider 182. In practice, the cam is arranged to provide a relatively quick forward motion of the slider (in the direction of the arrow 188) and a relatively slow return motion in the opposite direction.

A pair of parallel levers 190 are joined by a pivot axle 192 near to their lower ends, and this axle is pivoted in stationary bearings (not shown) so that the levers 190 are able to oscillate about the axle 192. At their upper ends, the levers 190 are slotted at 194, and a stub axle 196 projecting from a top slider block 198 engages in each of the slots 194. The block 198 is formed by two members engaging respectively on opposite sides of a fixed central guide rod 200 of rectangular cross-section. A cross pin 202 carried by the rear slider block 184 passes through slots (not visible in FIG. 7) in the levers 190, at a position between the pivot axle 192 and the connection of the levers 190 to the top slider block 198. Thus, as the slider 182 reciprocates, rocking motion is applied to the levers 190 and these produce a horizontal reciprocation of the top slider block 198. It will be apparent that the slider block 198 travels through a greater distance than the slider 182 by virtue of the velocity ratio of the lever 190.

A substantially triangular frame 204 has its apex fixed to the top side of the top slider block 198, and its two forward apexes are fixed respectively to top front slider blocks 206, only one of which is shown in FIGS. 7 and 8. It is to be understood that the main cam 178 is on the vertical central plane of the sealer driving mechanism, and that this mechanism is symmetrical about this central vertical plane. Consequently, the front top slider block 206 — and all the mechanism associated therewith, which is more clearly shown in FIG. 8, is duplicated below the other front corner of the triangular frame 204. Since this mechanism is merely duplicated, it is not illustrated to avoid making the drawing unduly complex.

The blocks 206 are similar to the block 198, and slide on respective fixed horizontal rods 208 of rectangular cross-section. Hence, during rotation of the cam 178, the entire top frame 204 with its three sliders 198 and 206 reciprocates in a horizontal plane.

Each fixed rod 208 forms part of a trapezoidal fixed frame at its own side of the sealer head and film feed mechanism. This frame includes a parallel horizontal rod 210 at a lower position, the two rods 208 and 210 being spaced apart and held together by a rear vertical strut 212 and a front inclined strut 214.

A pair of coaxial stub axles 216 project from opposite faces of each front top slider 206, these axles engaging in slots 218 in the upper ends of a pair of levers 220 disposed one on each side of the inclined strut 214. The lower ends of the levers 220 embrace a front bottom slider block 222 similar to the top slider blocks, and running on the bottom horizontal rod 210. The blocks 222 are fixed to a transverse inverted channel 225 which forms part of the carriage 172.

The fulcrum for the levers 220 is provided by a pair of coaxial stub axles 224 projecting on opposite sides of a sleeve 226, which embraces the inclined strut 214. As is clearly shown in FIG. 8, these axles engage in slots 228 in the levers 220. Thus, as the slider block 206 moves forwardly, the block 222 is moved rearwardly by virtue of the action of the levers 220, and therefore due to the action of the main cam 178, the carriage 172 has a slow advance movement in the direction of the arrow 230 and a quick return movement in the opposite direction.

As will become apparent hereinafter, it is desirable to be able to adjust the length of the working stroke of the carriage 172, and this is achieved by altering the position of the fulcrum 224. The sleeve 226 which carries the fulcrum stub axles 224 is able to slide on the inclined strut 214, and it has a lug 232 which is internally screw-threaded, to receive an adjusting screw 234. The latter is located in bearing blocks 236 and 238 on the strut 214, and a spiral gear wheel 240 is secured on the lower end of the adjusting screw. An adjusting shaft 242 extends transversely of the mechanism, and has two spiral pinions 244 keyed thereon, to mesh with the wheels 240.

The shaft 242 is coupled to a means (not shown) for rotating it and these means are preferably manually operated. For example, there may be a control knob on the housing 174, so that the machine operator can, by turning the knob, rotate the adjusting shaft about its own longitudinal axis. Alternatively the shaft 242 could be geared to a small electric motor, controlled by push buttons, so that operation of the motor in one direction causes rotation of the shaft 242 in a clockwise direction, and operation of the motor in the opposite direction causes rotation of the shaft 242 in the anti-clockwise direction.

Now, it will be apparent, that when the shaft 242 rotates, the screw 234 is also rotated, and this causes the sleeve 226 with its fulcrum axles 224 to be raised or lowered. Raising the fulcrum increases the length of stroke of the carriage 172, and lowering the fulcrum reduces that stroke. Further, since the angular velocity of the cam 178 remains constant (so that the cycle of the carriage 172 always takes the same length of time) increasing the length of travel of the carriage also increases its velocity and vice versa.

The levers 190, frame 204 and levers 220 together form a linkage for operating the reciprocation of the carriage 172. It is possible to vary the stroke of the carriage by adjusting the effective length of any one of the elements of this linkage. Adjustment of the fulcrum for the levers 220 provides a simple and effective way of doing this.

Referring now to FIGS. 9, 12 and 13, the carriage 172 comprises the inverted channel member 225, which extends transversely of the machine, and from which there depend four legs 246, two on the loading edge of the channel and two on the trailing edge thereof. The two leading legs 246 provide journal mountings for the leading roller 248, and the two trailing legs provide a similar mounting for the trailing roller 250. The position of the slider block 222 is indicated in FIG. 9 by the holes 252, which are the bolt holes for fastening the block to the channel 225. The rollers 248 and 250 roll on the film as it is travelling on the belt 134 (film feed conveyor 18) and nip the film on to that belt to control the film during the sealing and severing operation.

Extending along the rear side of the carriage and sealer head mechanism (and within the housing 174) is a roller chain assembly 254 the length of which coincides approximately with the length of the lower chain 120 (see FIG. 4). This assembly includes an endless chain 256 extending around two chain sprocket wheels 258 and 260 on spaced horizontal shafts. The shaft 262 of the sprocket wheel 260 extends into the main drive housing 54, and carries a driven sprocket wheel 264 by a chain 266, which is itself driven from the drive to the lower chain conveyor 120. The arrangement of this chain drive is such that the lower horizontal run of the chain 256 moves in the forward direction indicated by the arrow 268 at a linear speed equal to that of the top run of the strips 132 and the top run of the P.T.F.E. belt 134.

A shaft 270 in extension of each of the rollers 248 and 250 carries a sprocket pinion 272 which engages with the bottom run of the chain 256. If one considers the chain 256 to be stationary, then as the carriage 172 is moved forwardly, the rollers 248 and 250 are caused to rotate in a clockwise direction as seen in FIG. 9, and as the carriage 172 moves rearwardly the rollers 248 and 250 are caused to rotate in an anti-clockwise direction. But the movement of the chain 256 produces only a differential translational movement between the pinions 272 and the bottom run of the chain, and in fact where this differential is reduced to zero, the rollers 248 and 250 do not rotate about their axes, but merely have a translational movement with the carriage 172.

Now it has already been mentioned that the bottom run of the chain 256 is travelling at the same linear speed as the top run of the strips 132 on the film feed conveyor. Therefore when the rollers 248 and 250 do not rotate about their own axes on the forward travel, the carriage 172 is moving in synchronism with the film feed conveyor and at the same linear speed.

At the front end of the trailing roller 250, there is an indicator disc 274 (see FIG. 11) which is secured to a short shaft extension of the roller 250, passing through a leg 276 secured to the channel 225. A pointer 278 is fastened to the front of the leg 276, and projects over the face of the disc. The latter is divided on its face into alternate dark and light sectors. This face of the disc 274 is visible on the front of the housing 174, and gives a visual indication of any relative movement between the carriage 172 and the lower run of the chain 256 when the carriage is advancing. If there is no relative movement (which is the desired condition) then there will be no rotation of the disc 274 as indicated by the finger 278.

If the indicator 274 shows that there is relative movement of the carriage 172 over the belt 134, it is necessary to adjust the speed of travel of the carriage as otherwise there would be a tendency for the rollers 248 and 250 to scuff the film or cause it to crease and curl. It is, of course, possible to adjust the speed of travel of the carriage by repositioning the fulcrum 224 as has been previously described. It will be seen therefore that the chain sprocket drive 254 provides a means of synchronising the advance movement of the carriage 172 with that of the film feed conveyor 18.

During the return motion of the carriage, there is a large differential movement between the pinions 272 and the chain 256 and the rollers 248 and 250 rotate rapidly but this is not important. In fact, the pitch circle diameter of the sprocket wheels 272 is equal to the outside diameter of the rollers 248 and 250. Consequently on the return motion of the carriage 172, the rollers 248 and 250 have a surface speed equal to that of the belt 134 on which the film is travelling and therefore the effect is that of passing the film through a pair of nip rollers (i.e. there is no slipping between the rollers 248 and 250 on the one hand and the belt 134 on the other).

As is clearly shown in FIG. 8 there are pairs of pillars 280 upstanding from the channel member 225, and a three part box beam 282 is slidable vertically between these pillars. The pillars 280 have depending legs 281 extending below the web of the channel member 225 and the upper part at the sealing head 150 has pads 283, one on each side, these pads being made of wear-resisting plastics material, and rubbing on the legs 157. Similarly there are pads 285 of wear-resisting plastics material on the sides of the box beam 282 for rubbing on the inside faces of the pillars 280. The pillars 280 are grooved as indicated at 287 to receive the ends of location pegs 289 and 291 projecting respectively from the beam 282 and the head 150. These pegs serve to prevent twisting of the beam 282 and the head 150 in the guide pillars 280. This beam forms a part of the sealer, and studs 284 (see FIGS. 9, 12 and 13) fastened at their upper ends to the beam 282 pass through clearance holes in the web of the channel 225 and are secured at their lower ends to the sealing head 150. A compression spring 286 surrounds each stud 284 and acts between the top surface of the channel 225 and the underside of a distance piece 283 located inside the beam 282 and engaging with the top thereof, thereby holding the beam 282 in its normal inoperative raised position, where the head 150 is in engagement with the underside of the web of the channel 225. In this position the severing wire 152 is clear of the film on the conveyor 18, the film being gripped by the rollers 248 and 250.

The mechanism for pressing down the sealer head 150 to carry out a sealing operation is shown in FIGS. 7, 8 and 14. A forward extension 288 of the main drive shaft 176 is provided with a sealer cam 290, the front end of the shaft 288 being supported in a fixed bearing (not shown). A pin 292 carried by the upright strut 212 provides a bearing for a compound link comprising a pair of parallel links 294 joined together at the trailing end by a cross piece 295. The links 294 are formed with slots 296 which receive the pin 292, so that the link can slide on the pin. A cam follower 298 is supported between the links 294 and is urged into engagement with the profiled periphery of the cam by a compression spring 300 acting between the trailing side of the strut 212 and the cross piece 295.

A bell cranked lever 302 has a pivot pin 304 supported in fixed bearings (not shown), one end of this lever being connected to the leading end of the links 294, and the other end being connected to a cross rod 306 which forms part of a depresser frame 308. This frame 308 consists of side bars 310 connected by cross rods 306 and 312, and the entire frame is mounted in guides (not shown) so that it is free to move vertically. Thus, as the cam 290 pushes the follower 298 and the links 294 forwardly, the consequent rocking of the bell cranked lever 302 causes the depressor frame 308 to be lowered. To assist in providing for vertical movement of the depresser frame 308, there may be a further bell cranked lever similar to the lever 302, this further lever being connected to the cross rod 312, and the two bell cranked levers being joined by a horizontal link so that they turn in unison.

The cam 290 is shaped so that it produces the depressing action as the carriage 172 is at its most retarded position (i.e. nearest to the film feed end of the machine) and the cam is further arranged to hold the frame 308 in the depressed condition until the carriage has arrived near to its most advanced position.

A series of four trolleys 314 (only one of which is shown in FIGS. 7 and 8) is provided. There is one such trolley on each outer part of the beam 282 and one near to each end of the middle part. Thus there are two trolleys at each side of the mechanism, and each has a pair of wheels 316 running on the underside of one of the side bars 310 of the depresser frame. The trolleys provide means whereby there is provision for motion between the carriage 172 and the depresser frame 308 which can only move vertically.

It will now be clear that during the return motion of the carriage, the sealing head 150 is clear of the film, but the rollers 248 and 250 are holding the film under control. In fact, these rollers never leave the top surface of the film 80, and hence they provide the means for nipping the two layers of film 80 and 92 on to the surface of the conveyor 18. These rollers 248 and 250 and the co-operating conveyor 18 provide the nip for the two layers of film which holds the layers in the required face-to-face relationship.

During the advancing motion of the carriage, the rollers 248 and 250 nip the film and the sealer head 150 is lowered to press the underside of the head on to the film. The wire 152 is pressed into the film and the resilience of the platform provided by the strip 132 allows the wire to press into the belt 134 to ensure that there is a close control over the heat sealing and severing process. Towards the end of the advance movement of the carriage, the head 150 is allowed to rise under the action of the springs 286.

A short arm 318 extends from the leading side of the box beam 282, near to its rear end, and this carries a depending leg 320 formed with a gear tooth rack 332 (see FIG. 10). A unidirectional clutch or freewheel device 324 is provided on the shaft 270 of the leading roller 248, and the outer race of this device is formed as a gear wheel 326 which meshes with the rack 332. The freewheel device is arranged to transmit anti-clockwise motion to the shaft 270 (as seen in FIG. 10) but not clockwise motion.

When the sealer head 150 is depressed to effect a seal, thee rack 322 transmits motion to the wheel 326 but this is not transferred to the shaft 270. However, when the sealer head rises, the rack 322 rotates the shaft 270 rapidly in an anticlockwise direction. Now at this stage, the roller 250 is on the leading end of the supply of film 80 and 92, but the roller 248 is only on the newly formed tube of film 170, which should be separated from the rest of the film. The sudden and rapid rotation of the roller 248 flicks the tube 170 forwardly separating it from the remainder of the film.

The operation of the sealing mechanism can be explained by reference to FIG. 31, wherein certain important elements of the mechanism are illustrated diagrammatically.

The main drive motor for the machine is connected via a variable ratio transmission (not shown) to the driving shaft 176 carrying the cams 178 and 290. The number of packages produced in a given time is governed by the angular velocity of the shaft 176 because the film is severed each time the cam 290 causes the sealing head 150 to descend. This angular velocity is preselected by setting of the transmission ratio between the driving motor and the driving shaft 176.

A second variable ratio transmission is provided between the shaft 176 and the drive to the film feed conveyor 18, and by adjusting this transmission, it is possible to determine the length of the packages produced between successive transverse seals. The length of the stroke of the sealer head 150 can also be varied, by adjusting the position of the fulcrum 224.

Now the proportion of each cycle of the cam 178 which produces forward movement of the sealing head 150 is fixed by the shape of the cam and the period of oscillation of the cam is determined by the (already chosen) angular velocity of the shaft 176. Hence is the length of the packages is varied, it is desirable that the length of the forward stroke of the sealer head should also be varied to match the speed of travel of the head to that of the film.

For example:- Suppose that the cam 178 causes the head 150 to travel forward for two-thirds of its cycle and return on the remaining one-third of its cycle. Then if the driving shaft speed and the film feed conveyor speed have been selected to produce flat tubes 6 centimeters long, the forward stroke of the head 150 must be 2/3 × 6 = 4 centimeters. If flat tubes 12 centimeters are being produced, then the length of the forward stroke must be adjusted to 8 centimeters.

The facility of adjusting the stroke of the head 150 therefore enables packages of different sizes to be produced, and it is an important advantage of the arrangement that the adjustments of driving shaft speed, film feed and length of stroke of the sealing head 150 can all be made whilst the machine is in operation.

It is also to be observed that the sealing head 150 is maintained in a constant orientation relatively to the path of movement of the film, and that the head has a perpendicular movement relatively to the path of the film for the purpose of applying sealing pressure to the film.

PRODUCT FEED AND TUBE OPENING MECHANISM.

It has already been noted that the articles to be wrapped are fed through the machine in synchronism with the film feed by means of a product conveyor 36 with carriers 38. The product feeding machanism is provided in a housing 328 which extends along the front of the film feed, film feed conveyor and part of the shrink tunnel conveyor 22. This mechanism will now be described in detail.

Referring to FIGS. 15 and 21, the conveyor 36 essentially consists of a pair of endless roller chains 330 wrapped around sprocket wheels 362, 364, 366 and 368 (see FIG. 24) which are arranged to provide long horizontal upper and lower runs of the chains. The two leading sprocket wheels 366 and 368 are on a common shaft and the two trailing sprocket wheels are on a second common shaft. However, the shaft 370 carrying the leading sprocket wheels extends into the main drive housing 54, where it is geared to the machine motor. Thus the product conveyor 36 is driven in timed relationship with the film feed conveyor 18.

A plurality of the product carriers 38 is provided and each has two parallel carrier rods 334 and 336 (see also FIGS. 16 and 18) which extend transversely of the conveyor. At its ends, the leading rod 334 has extension pins 338 which fit directly into hollow pins of the chains 330, so that the chains carry the rods 334 with them. The rods 336 are connected to the chains by swing links 339 so that they are free to move up and down relatively to the chains.

Each carrier 38 has a body 340 which is made as a moulding in metal or plastics. Reference to FIG. 17 shows that this body 340 is generally channel shaped. At each end of the carrier 38, there is a support block 341 or 343. Wing portions 342 depend from the block 341 and similar wing portions 344 depend from the inner block 343 (See FIGS. 16 to 18) and there are holes in these wings to receive the rods 334 and 336. In addition there are slide rods 345 and the body member 340 is free to slide on the slide rods 345 (i.e. it is free to move transversely of the machine).

An article support tray 346 is secured to the two body members 341 and 343, and as is clearly shown in FIGS. 16 to 18, this tray is of generally channel-shaped cross-section but its inner walls are inclined towards each other towards the bottom, so that the tray is adapted to support rolls of wallpaper of different diameters after the manner of a Vee block. FIG. 18 illustrates in chain dotted lines a larger diameter roll R and a small diameter roll r and it will be observed that both can fit snugly into the tray 346.

A slipper block 348 at each end of the outer body member 340 runs on a guide plate 350 to hold the carrier 38 on to the path determined by the plate 350, but the slipper block is free to leave the plate 350 when the carrier is turning round at the end of the conveyor 36.

Below the outer body member 340, there is a downwardly projecting column 352, which at its lower end provides a support for a slider 354. This slider may take the form of a roller rotatable about a vertical axis if required.

Referring now to FIG. 24, the product feed housing 328 comprises side frame members 356 and 358 connected together by rigid spacer members 360. The product conveyor 36 is a chain sprocket conveyor and is guided on the sprocket wheels 362, 364, 366 and 368, the shafts of which are journalled in the side frame members.

A tray cam track 372 is fixed on the framework of the product feed mechanism and consists of a channel within which runs the slider 354 on the outer body memeber 340. In FIG. 24 only the centre line of the tray cam 372 is shown. The cam track is endless and follows a general pattern of the product conveyor itself, as seen in elevation. However, the top run of this track comprises a short run 374 parallel to the general direction of the product through the machine, a rearwardly inclined portion 376, a second portion 378 parallel to the general direction of the product through the machine, a forwardly inclined portion 380, a third portion 382 in the general direction of travel, and a final forwardly inclined portion 384. The major part of the return run of the track is inclined to return from the forward position at the outer end of the portion 384 to the said portion 374 at the input end.

As the carrier 38 is travelling along the top run of the conveyor, the slider 354 follows the path of the tray cam track 372, the portion 376 of the cam track producing a rearwardly inclined travel 40 shown in FIG. 3 and the forwardly inclined portions of track 380 and 384 producing the corresponding forwardly inclined motions 44 and 48 of the carrier. Hence it will be seen that the cam track 372 is used to produce the transverse movements of the carriers 38 as the latter travel along the top run of the product conveyor 36.

Each carrier 38 is provided with a finger opening mechanism indicated generally at 386 in FIGS. 15, 16, 18, 20 and 22. Two opening shafts 388 and 390 extend along opposite sides of the carrier 38 and each is provided with an operating plate 392 which is secured to the shaft 388 or 390 for rotation therewith. A finger plate 394 is mounted for rotation on the shaft 388 or 390. The two finger opening mechanisms are identical, excepting that they are adapted to operate in opposite directions, so that it is only necessary to descrbie one in detail. A torsion spring 396 wrapped around the shaft 388 has one limb 398 engaging with the underside of the plate 394 and the other limb 400 engaging with the top side of the plate 392. Thus the spring 396 normally holds the plate 392 flat on a lug 402 projecting from the plate 394 so that the plates 392 and 394 are almost in the same plane. When the finger opening mechanism is in the inoperative position shown in FIG. 15, the plate 394 associated with the operating shaft 388 overlies the corresponding plate associated with the shaft 390.

Each finger opening mechanism includes three rods 406, 408 and 410. The rod 406 is fixed to and projects rearwardly from the rear end of the carrier 38. Each of the rods 408 and 410 is connected to the plate 394 by screws 412 which pass through slots 414 in the plate so that it is possible to adjust the lateral displacement of the fingers relatively to the longitudinal centre line of the carrier 38, and relatively to each other.

If the shaft 388 is rotated in an anti-clockwise direction as seen in FIGS. 16 and 22 from the inoperative position where the plate 394 is substantially horizontal to the operative position shown in FIG. 22, then the operating plate 392 moves through an angle somewhat greater than a right angle and carries the plate 394 with it. However the movement of the plate 394 is restricted (as will appear hereinafter) and during the final part of the movement of the plate 392, the plate 394 remains in a substantially vertical position and the plate is allowed to complete its motion by opening the spring 396.

At its forward end, the shaft 388 has a portion 416 of slightly enlarged diameter and a part helical groove 418 is formed in this enlarged portion (see FIG. 23). A trunnion member 420 is slidable on the rod 334 and has a spigot 422 which engages in the helical groove 418. A slider member 424 projects below the body of the trunnion member 420, and as illustrated in FIGS. 15, 19 and 20, this slider 424 engages in a channel shaped finger operating track 426. This track 426 is arranged in an endless path similar to that of the tray cam track 372, the axis of the track 426 being indicated in FIG. 24. It will be observed that throughout the greater part of the length of this track, it is parallel with the track 372. However, at 428 there is a section of the track 426 which diverges rearwardly from the track 372 and at 430 there is a portion of the track 426 which converges with the track 372.

Now it will be apparent that so long as the two tracks 372 and 426 are parallel, the sliders 354 and 424 must move in parallel paths so that there is no relative movement between the trunion 420 and the remainder of the carrier 38. When the slider 424 traverses the section 428 of this track, it moves rearwardly along the rod 334, and since the shaft 388 is locked against axial movement, the rectilinear motion of the trunnion is converted into rotary motion of the shaft 388. In practice, the part helical groove 418 is arranged to produce 105° rotary movement of the shaft 388 during this rearward stroke of the trunnion member 420. The shaft 388 remains in this turned position through the movement between the track portions 428 and 430, and then when the slider 424 traverses the track portion 430, the trunnion member is moved forwardly on the rod 334 to turn the shaft 388 back to its original orientation.

Thus the track 426 produces the rotation of the shaft 388 which is required to turn the finger operating mechanism 386 from the inoperative horizontal position to the operating vertical position. It will be appreciated that there is a similar trunnion member operating on the shaft 390 and that the sliders of the two trunnion members both run in the same track 426. However the slider of the shaft 388 leads that of the shaft 390 in the track, so that the shaft 388 turns a little in advance of the shaft 390. Hence the plate 394 appertaining to the shaft 388 lifts out of the way of the plate appertaining to the shaft 390 before the latter commences to move.

As will appear hereinafter, the finger opening mechanism provides a means of opening one end of the plastics tube 170, for the insertion of the roll of wallpaper R. However, a pusher mechanism has to be provided for pushing the roll R transversely of the carrier 38, into the tube 170. Referring to FIGS. 25 and 26, a pair brackets 440 and 442 is provided at each end of the carrier 38, one such pair being connected to the body member 340, and the other to the rear end of the tray 346. A pair of pusher guide rods 444 and 446 extends longitudinally of the carrier 38, each of these guide rods being supported in two of the brackets 440 and 442. (The pusher mechanism has been omitted from FIGS. 15 to 20 for clarity). A pusher block 448 is slidably mounted on the guide rods 444 and 446, and is thereby able to traverse over the tray 346 of the carrier 38. A thrust rod 450 projects rearwardly from the pusher block 448, and at its rear and, this rod 450 carries a pusher disc 452, which is of a size convenient for engagement with the end of a roll R to be wrapped. The length of the thrust rod 450 is such, that the pusher disc 452 can pass over the finger opening mechanism 386, when the pusher block 448 arrives at its rearmost position, which is approximately in line with the rear end of the tray 346.

Two fixed cam members 454 and 456 are provided above the product conveyor 36 (see also FIG. 27). Each of these cam members 454 and 456 consists of a straight angle iron, supported on brackets 458 which extend upwardly from the framework of the product feeding mechanism housing 328, the brackets 458 having cantilever type arms at their upper ends, which hold the cam members 454 and 456 suspended above the product conveyor 36.

A cylindrical follower 460 projects above the pusher block 448, and is in vertical alignment with the cam members 454 and 456. It will be seen from FIG. 27, that the cam member 454 is inclined rearwardly in the direction of movement of the conveyor 36, and consequently, when the follower 460 engages with this cam member, subsequent longitudinal traverse of the carrier 38, produces rearward transverse movement of the pusher block 448, with its disc 452. This is the movement required to push the roll R rearwardly into the opened-out tube of plastics film 170.

The cam member 456 is arranged beyond the cam member 454 in the direction of travel of the conveyor 36, and is inclined forwardly relatively to that direction. Consequently, when the follower 460 engages with the cam member 456, further progression of the carrier 38 causes the pusher block 448 with its disc 452 to be retracted to the original forward position, where the disc 452 lies in front of the position to which a roll R will be fed when that particular carrier returns to the input end of the machine.

It will be seen therefore, that this simple arrangement of overhead fixed cam tracks, operating in conjunction with a slidable pusher on the carrier 38, provides a means of pushing the roll R rearwardly, and then returning the pusher to its original position.

At the input end of the product feel conveyor 36, rolls of wallpaper such as R, are placed in the carrier trays 346 by hand. It will be appreciated, of course, that there can be automatic feed mechanism for delivering the wallpaper rolls to the carriers 38 from a preceding operation. When a carrier 38 moves rearwardly in the direction indicated by the line 40 in FIG. 3, the rods 406, 408 and 410 of the finger opening mechanism 386 are positioned in the plane 10, which is between the layers of the films 80 and 92. This movement of the rods into the rearmost position is permitted, because at this position the films 80 and 92 are passing through the nips of their respective rollers 94 and 96 and are therefore widely spaced from each other. The guide rollers 98 and 100 are also spaced apart to accommodate the thickness of the rods 406, 408 and 410 therebetween, and in any event, the rods only pass over the roller 100, but do not project below the roller 98.

During the subsequent movement of the carrier in the general direction indicated by the line 42 in FIG. 3, the rods 406, 408 and 410 remain trapped between the two layers of film which are now brought face-to-face by the rollers 248 and 250 and the conveyor 18.

Whilst the carrier 38 is traversing alongside the film feed conveyor 18, the sealing and severing mechanism previously described, operates to seal and sever the film on opposite sides of the set of rods, forming a flattened film tube 170 (see FIG. 6) with the rods 406, 408 and 410 projecting into the front end of this tube.

During the movement of the carrier 38 indicated by the line 44 in FIG. 3, the cam 426 operates on the trunnion members to turn the shafts 388 and 390, turning the finger opening mechanisms 386 into their respective operative vertical postions. The fixed rods 406 engage with the bottom film 92 and hold the median portion of that layer down on the wrapper conveyor 20. The rods 408 and 410 however in turning to their vertically spaced position pull on the layers of film 80 and 92 forming the film tube into an opened-out tube as indicated in FIG. 29. It is evident that with the forward end of the tube thus opened out, it is possible to insert a roll R into the tube. It will be clear therefore, that at the input end of the machine, and indeed until the opening mechanism arrives at the wrapper conveyor 20, the finger operating mechanism 386 remains in the collapsed condition wherein it occupies a substantially flat plane. At the wrapper conveyor however, the mechanism is activated to open out the rods and so open the tube 170.

The shafts 388 and 390 are always rotated through some fixed angle, and this is large enough to turn the operating plates 392 through an angle greater than 90° (in the present instance, through 105°). If the plates 394 are unrestrained, they will be turned through about 90°, but in most cases, the tube 170 will prevent the plates 394 opening to their full extent. This is accommodated by the spring 396 which yields to allow the plate 392 to move away from the plate 394.

As the carrier 38 is then retracted forwardly, following the line 44 in FIG. 3, it draws the film tube forwardly, because of course, the rods 406, 408 and 410 act as fingers grabbing the inside of the tube by frictioned angagement therewith. Also, co-incidental with the forward retraction of the carrier 38 the pusher machanism causes the roll R resting in the tray 346 of that carrier to move rearwardly as indicated by the lines 45 and 47 in FIG. 3. This has the effect of pushing the roll R completely into the film tube 170. It will be understood that in this region of the machine there is chicane effect between the film tube 170 and the roll R which enable the film to be drawn over the roll. The rods 406, 408 and 410 only open out the front end of the tube 170, but providing this opening effect is large enough to enable the roll to pass easily into the open end, subsequent movement of the roll into the tube is easy, because the roll itself then opens out the tube, as it progresses into it. It fact the rods 406, 408 and 410 also act as guides for the roll R and prevent interengagement between the rear end of the roll and the front edges of the film tube which would prevent entering of the roll into the tube. Towards the end of the top run of the carrier 38, and after withdrawal of the pusher 452, the finger opening mechanism returns to its original flat condition and can then easily be withdrawn from the tube 170 as shown in the right-hand end of FIG. 3. The complete package comprising the film 170 with the roll R inside it then passes through the heat shrink tunnel 24 and this causes the film to shrink tightly on to the periphery of the roll R, and at the same time causes the portions of the tube which project beyond the ends of the roll to shrink inwardly, thus substantially closing the ends of the pack.

It is to be understood that the machine could be provided with end sealers adapted to operate on the ends of the tube 170 between the withdrawal of the opening fingers and the entry of the pack into the shrink tunnel. This would be necssary, for example, if the article being wrapped were of such a nature that a completely sealed pack is required.

ALTERNATIVE OPENING MECHANISM

Referring now to FIG. 30, there is shown an alternative tube opening mechanism 500, which can be provided on each of the carriers 38, in place of the finger opening mechanism 386 illustrated in FIGS. 15 and 20.

There are longitudinally extending guide rods 502 and 504 similar to the rods 334 and 336, and these are supported at their rear ends in a body member 506 which takes the place of the body member 340 in the previously described construction. In this arrangement however, the body member 506 has two upstanding wings 508 and 510 one at each side of the body member, so that there is plenty of space for the roll R to pass therebetween.

A finger operating slider member 512 has bosses which are bored to receive the guide rods 502 and 504, so that the member 512 is slidable longitudinally of the carrier 38, in the direction indicated by the arrows 514. On the leading side of the slider member 512, there is a projecting lug 516, and a peg 518 extends vertically through this lug and carries a cylindrical cam follower 520 at its lower end. The follower 520 engages in the cam track 426 (see FIG. 24) so that the movement of the slider 512 is controlled by the cam track 426 in exactly the same manner as the trunnion member 420 shown in FIG. 15. However, in the opening mechanism 500, the slider member 512 is not used to cause rotation of a shaft, and therefore there is no necessity for the pin 422 and helical groove 418 as described in the previous construction.

Instead, the slider member 512 has a pair of upstanding wings 522 and 524 each of which, carries a pivoted boss 526 formed with a diametral hole, through which passes a connecting rod 528. The rear end of the rod 528 passes through a boss 530 formed on an arm 532 of a lifting member 534 which is pivoted on coaxial pins 536 supported by the wings 508 and 510. The boss 530 is pinned to the rod 528 so that movement of the rod 528 is always transmitted to the lifter member 534. A collar 538 is secured on to the rod 528 by a grub screw (not shown) and a compression spring 540 surrounds the portion of the rod 528 which extends between the pivoted boss 526 and the collar 538. When the slider member 512 moves rearwardly, due to the engagement of the follower 520 with a portion of the cam 426, motion is transmitted through the boss 526 and the rod 528, to the lifter member 534, which in consequence is turned through an angle about the pivots 536. This upward swinging of the lifter member 534, is accomodated by rotation of the boss 526 about its own axis on the respective wing 522 and 524. It will be appreciated, that the linear distance through which the boss 526 is carried by the member 512 is fixed, by the shape of the portion of the cam 426, which produces this linear motion. On the other hand, the angle through which the lifter member can turn is restricted by the size of the plastics tube which is being opened. Consequently, after the lifter member 534 has been arrested in its upward movement, further rearward movement of the boss 526 is accommodated by that boss sliding along the rod 528, compressing the spring 540. On the return movement of the pusher member 512, the spring 540 expands, and returns the boss 526 to its original position relatively to the rod 528, before the lifter member 534 begins to descend.

The lifter member 534 comprises central bridge having an arched portion 542 of a large enough radius to permit a roll R to pass therethrough, this arched portion being supported on cranked arms 544 joined by lateral sections 546 to bell-cranked sections, which include the arms 532. The carrier 38 also includes two fixed rods 548 which are similar to the rods 406 in the previously described finger opening mechanism.

In the normal inoperative position, the lifer member 534 occupies the position illustrated in FIG. 30, where the bridge lies in the same plane as the fixed rods 548. With the lifter member in this position, it is possible for the rear portion of the rods 548 and the lifter member 534 to enter between the two layers 80 and 92 of plastics film at the input end of the machine. When a bag 170 is formed by the sealing and severing mechanism, the position is as illustrated in FIG. 30, and at this stage, the pusher member 512 is moved rearwardly, and as a result of this, the arched portion 542 of the lifter member pulls the upper part of the tube 170 away from the lower part (which is retained by the rods 548) and the cranked portions 544 of the lifter member hold the sides of the tube open. It is then possible for the pusher mechanism, to push the roll R into the tube at the same time as the carrier 38 is being retracted forwardly as described with reference to the previous construction.

The lifter 534 is however a very effective method of opening the tube 170, and in particular, since even in its raised position, the portions 544 are still inclined rearwardly and upwardly, this means that the lifter is gripping the tube 170 very tightly, and it is highly unlikely that the tube can slip off the rods 548 and the lifter member 534 during the insertion of the roll R.

It is to be understood that a machine similar to that described above, can be used with film which is centrefolded, so that only one such film is required, the fold producing the two layers. It is then necessary to ensure that the two layers are opened from each other at the opposite edge of the film to the fold, when the film is at the input end of the machine to allow the tube opening mechanism (which may be that illustrated in FIGS. 15 and 20 or that illustrated in FIG. 30) to enter between the two layers. After this, the two layers are brought into face-to-face relationship to permit the rapid sealing and severing operation by the film feed conveyor 18 and the feed carriage 172, as previously described.

It will be appreciated that it is desirable to use two layers of film of the same width. However, it is possible to use layers of different widths, provided that the tube opening mechanism is inserted between the two layers.

Clearly a machine in accordance with the invention can be used to wrap goods than wallpaper, although it will generally be necessary to modify the detailed construction of the machine. For example, if a non-cylindrical article is to be wrapped, then it may be necessary to provide a product conveyor of different shape to that shown in FIGS. 15 to 20. In some instances, the carrier may have a flat bed with vertical guide walls projecting upwardly therefrom. In another instance where cylindrical articles are to be wrapped, the tray of the product carrier is replaced by two parallel cylindrical rods on which the article rests. This latter arrangement permits the pusher to be operated by fixed cams below the top run of the product conveyor 36, the connection between the cam follower and the pusher passing through the gap between the two rods. Also, if articles of a noncylindrical shape are to be wrapped then the arrangement of the tube-opening mechanism will have to be altered.

I claim:

1. A method of forming a package, which includes the steps of: continuously feeding two layers of wrapping film through a sealing station at a preselected velocity; selecting the cycle frequency of a reciprocable sealing device having a path parallel to that of the film feed to determine the distance between transverse seals formed by said sealing device on said two layers of wrapping film; selecting the stroke length of said sealing device so that it travels in a forward direction at the same linear speed as the film, and bringing the sealing device into operative relationship with the layers of film during at least part of its forward travel in each cycle to produce a transverse sealing together of the two film layers.

2. A method of forming a package as claimed in claim 1, in which the sealing device is maintained in a constant orientation relatively to the path of the film throughout the reciprocating cycle of the sealing device.

3. A method of forming a package as claimed in claim 1, in which the film layers are severed during formation of a transverse seal along a transverse line bounded on both sides by said transverse seal, to separate a film tube in advance of said tranverse line from the following film; said film tube being sealed along tranverse edges but open at the longitudinal edges.

4. A method forming a package as claimed in claim 1, in which the two layers of wrapping film travel in a forward direction on a continously moving conveyor and the sealing device has a compound movement in its forward traverse, including a movement perpendicular to and towards the conveyor.

5. A method of forming a package according to claim 1, including gripping said two layers of film between a continuously moving conveyor and feed carriage reciprocable in unison with said reciprocable sealing device, whereby the nip on said film layers between said conveyor and said feed carriage travels during its motion in the direction of movement of said film so that there is no relative movement said nip and said layers of film.

6. A method of forming a package as claimed in claim 1, which includes heating a sealing device at least during the period that the sealing device is brought into operative relationship with the wrapping film.

7. A method of forming a package as claimed in claim 4, in which after a package has been severed from the layers of film, said package is given a rapid forward movement relatively to the forwardly travelling film layers to separate that package completely from the following package.

8. A method of forming a package according to claim 5, wherein said sealing device is brought into the operative relationship with said layers of film during only a part of the forward movement of said feed carriage.

9. In the method defined in claim 1, the step of simultaneously with said transverse sealing operation severing said film layers along a line extending transversely across the transverse seal to thereby separate a film tube in advance of said transverse line from the following film.

10. A method of forming a package according to claim 5, wherein said feed carriage is maintained in engagement with said film layers throughout its cycle.

11. A sealing mechanism for sealing together two layers of wrapping film at longitudinally spaced apart position comprising, traversing means for traversing said two layers of film in a forward direction along a predetermined path; said traversing means including a continuously moving conveyor and holding means for nipping said two layers of film on to said conveyor; a mechanism for reciprocating said holding means along a path parallel to said predetermined path and a driving mechanism for both of said conveyor and said holding means, said driving mechanism including a variable device providing means for varying the cycle frequency of said reciprocable holding means relative to the linear speed of said film; a sealing device reciprocable with said holding means and mechanism for bringing said sealing device into operative relationship with said film layers during at least part of the forward motion of said holding means.

12. A sealing mechanism as claimed in claim 11, wherein said driving mechanism includes a first cam mechanism geared to said conveyor and adapted to produce reciprocation of said holding means, and a second mechanism geared to said conveyor and adapted to produce movement of said sealing device towards said conveyor during that part of the cycle of said holding means when said sealing device is required to carry out its sealing function.

13. A sealing mechanism as claimed in claim 11, in which the length of stroke of the holding means is adjustable.

14. A sealing mechanism as claimed in claim 11, in which the holding means is adapted to remain in a constant orientation relatively to the path of movement of the layers of film.

15. A sealing mechanism as claimed in claim 11, in which the holding means comprises a carriage having a pair of rollers for engagement with the film.

16. A sealing mechanism as claimed in claim 15, in which the rollers are each geared to an endless chain driven at a linear speed directly related to that of the conveyor element.

17. A sealing mechanism as claimed in claim 15, in which at least one roller of the carriage is adapted to be given a sudden rotation at the end of the forward movement of the carriage, for the purpose of pulling a tube of film away from the following bulk of film.

18. A sealing mechanism as claimed in claim 13, in which the means for causing reciprocation of the holding means comprises an oscillating motion transmitter of variable stroke length.

19. In a packaging machine, means for continuously feeding two superposed webs of wrapping material along a horizontal path, means providing a continuously moving conveyor flight underlying the leading ends of said superposed webs, and means for forming the leading ends of said webs into successive separate tubes of said material comprising means vertically movable into engagement with the uppermost web while said superposed webs are moving along said conveyor flight for forming narrow transverse longitudinally spaced heat sealed areas across the moving webs while at the same time transversely severing the webs within said areas to form separate tubes of said material and movable vertically away from said uppermost web after each tube is severed, and means for effecting said vertical movements in timed relation while reciprocating said movable means longitudinally of said path between said vertical movements.

20. In a packaging machine, means for feeding two superposed webs of wrapping material in a longitudinal path, means for providing narrow transverse seal areas extending across the moving webs in predetermined spaced relation longitudinally of said path, means for severing said webs transversely within said sealed areas to form separate tubes of said material at the leading ends of said webs, and means synchronized with said sealing and severing means for automatically displacing each said formed tube a predetermined distance forwardly of the leading ends of the webs from which it has been separated.

21. In the packaging machine defined in claim 20, said severing means being disposed to sever the webs at the time of sealing.

22. In the packaging machine defined in claim 20, said means for displacing said tubes comprising means for accelerating the speed of movement of each severed tube along said path.

* * * * *